US009755821B2

(12) United States Patent
Jang et al.

(10) Patent No.: US 9,755,821 B2
(45) Date of Patent: Sep. 5, 2017

(54) DEVICE INCLUDING SINGLE WIRE INTERFACE AND DATA PROCESSING SYSTEM INCLUDING THE SAME

(71) Applicant: Samsung Electronics Co., Ltd., Suwon-si (KR)

(72) Inventors: Ho Rang Jang, Seoul (KR); Suh Ho Lee, Seongnam-si (KR); Tomas Scherrer, Yongin-si (KR); Jun Ho Huh, Yongin-si (KR); Chul Jin Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/072,470

(22) Filed: Mar. 17, 2016

(65) Prior Publication Data

US 2016/0294544 A1 Oct. 6, 2016

Related U.S. Application Data

(60) Provisional application No. 62/141,924, filed on Apr. 2, 2015.

(30) Foreign Application Priority Data

Jul. 14, 2015 (KR) .......................... 10-2015-0099858

(51) Int. Cl.
*H04L 7/00* (2006.01)
*H04L 7/04* (2006.01)
(Continued)

(52) U.S. Cl.
CPC .......... *H04L 7/048* (2013.01); *G06F 13/4291* (2013.01); *H04B 1/16* (2013.01);
(Continued)

(58) Field of Classification Search
CPC ..... H04L 7/048; H04L 7/0037; H04L 7/0054; H04L 7/0008; H04L 7/0337; H04L 7/044;
(Continued)

(56) References Cited

U.S. PATENT DOCUMENTS

| 6,178,161 | B1 * | 1/2001 | Terry ..................... H04L 5/1438 370/276 |
|---|---|---|---|
| 7,376,020 | B2 | 5/2008 | Sorrells et al. |
| 7,406,100 | B2 | 7/2008 | Rocas et al. |
| 7,519,005 | B2 | 4/2009 | Hejdeman et al. |
| 7,752,365 | B2 | 7/2010 | Taylor et al. |
| 7,881,415 | B2 | 2/2011 | Ng |
| 8,315,331 | B2 | 11/2012 | Saito et al. |
| 8,509,318 | B2 | 8/2013 | Tailliet |
| 8,694,710 | B2 | 4/2014 | Bas et al. |
| 8,711,418 | B2 | 4/2014 | Cho |
| 8,719,613 | B2 | 5/2014 | Neben |
| 8,750,324 | B2 | 6/2014 | Hansquine et al. |

(Continued)

FOREIGN PATENT DOCUMENTS

| JP | H1013393 | 1/1998 |
|---|---|---|
| JP | 2003157230 | 5/2003 |
| KR | 100946686 | 3/2010 |

*Primary Examiner* — Rahel Guarino
(74) *Attorney, Agent, or Firm* — Onello & Mello, LLP.

(57) ABSTRACT

A master device communicates with a slave device through an asynchronous serial communications link. The master device includes a single pad configured to communicate a command frame including an address and a data frame including data with the slave device via a single wire; and a processing circuit configured to generate an oversampling clock signal from a clock signal, to perform a synchronization process for selecting one of a plurality of clock phases of the oversampling clock signal, and to perform a sampling process for sampling an each bit value included in the data frame transmitted from the slave device using a clock phase at the same position as the clock phase selected during the synchronization process.

20 Claims, 25 Drawing Sheets

(51) Int. Cl.
*H04B 1/16* (2006.01)
*G06F 13/42* (2006.01)
*H04L 7/033* (2006.01)

(52) U.S. Cl.
CPC .......... *H04L 7/0037* (2013.01); *H04L 7/0054* (2013.01); *H04L 7/0087* (2013.01); H04L 7/0008 (2013.01); H04L 7/0337 (2013.01); H04L 7/044 (2013.01)

(58) Field of Classification Search
CPC .. G06F 13/28; G06F 13/4282; G06F 13/4291; H04B 1/16; H03K 19/01759
USPC ........ 375/354, 365, 356, 369, 370; 714/776, 714/761, 787, 788, 800
See application file for complete search history.

(56) References Cited

U.S. PATENT DOCUMENTS

| | | |
|---|---|---|
| 8,775,707 B2 | 7/2014 | Poulsen |
| 9,015,393 B2 | 4/2015 | Korpinen et al. |
| 2013/0246675 A1 | 9/2013 | Korpinen et al. |
| 2013/0322461 A1* | 12/2013 | Poulsen .................. H04J 3/02 370/458 |
| 2014/0189178 A1 | 7/2014 | Wang |
| 2014/0281082 A1 | 9/2014 | Bagger |
| 2014/0304443 A1 | 10/2014 | Poulsen |
| 2015/0074306 A1 | 3/2015 | Ayyagari et al. |
| 2015/0149672 A1 | 5/2015 | Mishra et al. |

\* cited by examiner

Command Frame Format (Burst)　CFFB

| START | MODE | DIR (R/W) | RANDOM | ADDRESS | BURST | BURST LENGTH | STOP |
|---|---|---|---|---|---|---|---|
| 1 bit | 1 bit | 1 bit | 1 bit | 9 bits | 2 bits | 5 bits | 1 bit |

FIG. 2

Command Frame Format (Random)　CFFR

| START | MODE | DIR (R/W) | RANDOM | ADDRESS | STOP |
|---|---|---|---|---|---|
| 1 bit | 1 bit | 1 bit | 1 bit | 9 bits | 1 bit |

FIG. 3

Data Frame Format　DFF

| START | MODE | DATA | STOP |
|---|---|---|---|
| 1 bit | 1 bit | 8 bit, 16 bit, 22 bit, 32 bit (implementation dependent) | 1 bit |

FIG. 4

| START | Description |
|---|---|
| 1 bit (LOW) | START DATA TRANSMISSION WHEN LEVEL OF SPEEDY TRANSITS FROM 1 TO 0 |

| STOP | Description |
|---|---|
| 1 bit (HIGH) | STOP DATA TRANSMISSION WHEN LEVEL OF SPEEDY IS 1 |

FIG. 7

| MODE | Description |
|---|---|
| 0 | COMMAND PHASE |
| 1 | DATA PHASE |

FIG. 8

| DIR (R/W) | Description |
|---|---|
| 0 | READ (direction change after the current frame) |
| 1 | WRITE (keep direction) |

FIG. 9

| RANDOM | Description |
|---|---|
| 1 | Random Address |
| 0 | Burst Address |

FIG. 10

| ADDRESS | Description |
|---|---|
| ADDRESS[8:0] | The address spaces support 512 destinations. |

FIG. 11

| BURST[1:0] | | Burst Type | Description |
|---|---|---|---|
| 0 | 0 | FIXED | Fixed-address burst |
| 0 | 1 | INCREMENT | Incremental-address burst |
| 1 | 0 | EXTENSION | Extended special command |
| 1 | 1 | STREAM | Infinite data. Master can use "write command" with any number of data. |

FIG. 12

| BURST LENGTH [4:0] | | | | | Description |
|---|---|---|---|---|---|
| 0 | 0 | 0 | 0 | 0 | Number of data transfers is 1 |
| 0 | 0 | 0 | 0 | 1 | Number of data transfers is 2 |
| 0 | 0 | 0 | 1 | 0 | Number of data transfers is 3 |
| ..... | ..... | ..... | ..... | ..... | ..... |
| 1 | 1 | 1 | 0 | 1 | Number of data transfers is 30 |
| 1 | 1 | 1 | 1 | 0 | Number of data transfers is 31 |
| 1 | 1 | 1 | 1 | 1 | Number of data transfers is 32 |

Parity Enable Register
0 : Disable
1 : Enable

Parity Status Register
0 : Parity Disable
1 : Parity Enable

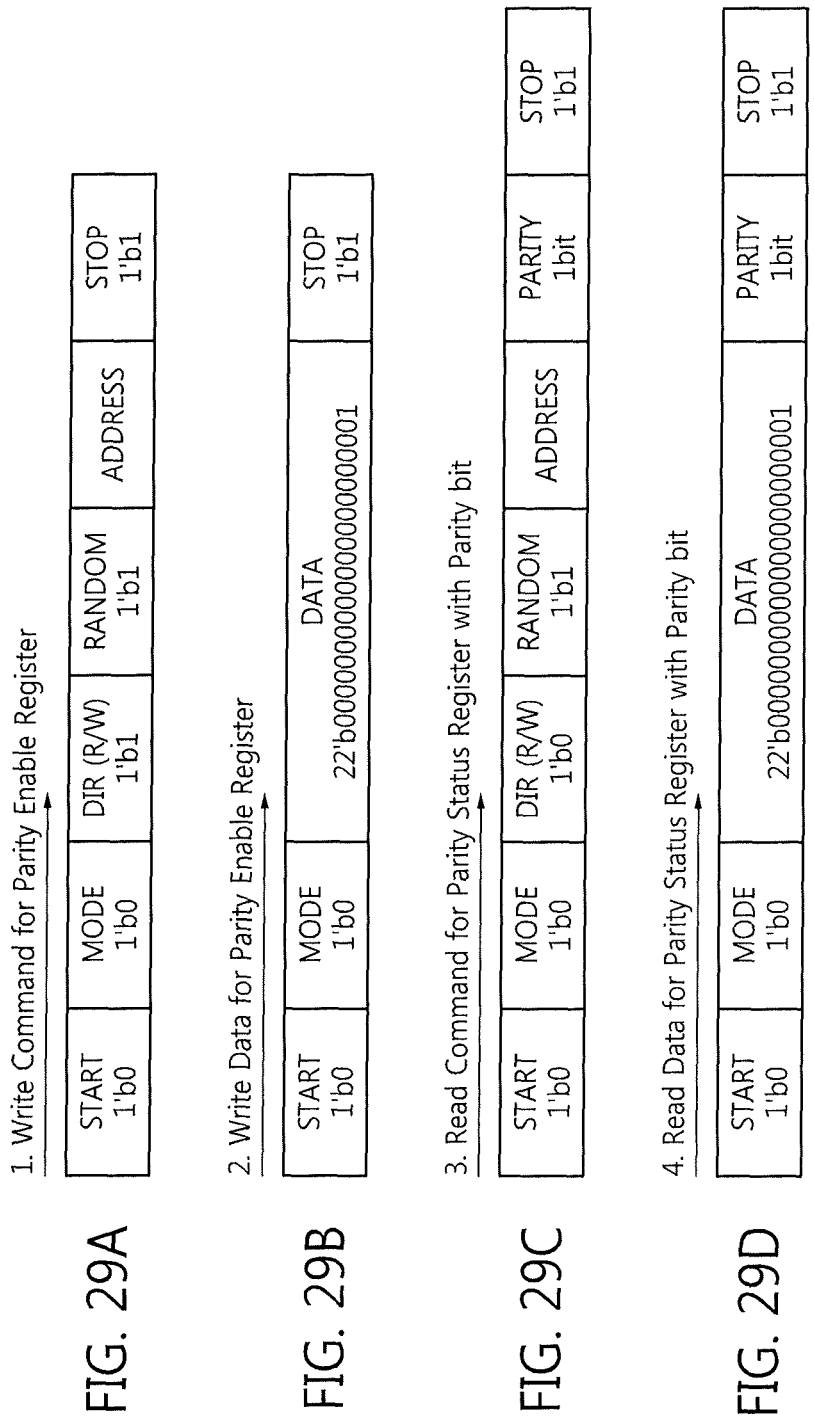

FIG. 30A

1. Write Command for Parity Enable Register with Parity bit

| START 1'b0 | MODE 1'b0 | DIR (R/W) 1'b1 | RANDOM 1'b1 | ADDRESS | PARITY 1bit | STOP 1'b1 |
|---|---|---|---|---|---|---|

FIG. 30B

2. Write Data for Parity Enable Register with Parity bit

| START 1'b0 | MODE 1'b0 | DATA 22'b00000000000000000000000 | PARITY 1bit | STOP 1'b1 |
|---|---|---|---|---|

FIG. 30C

3. Read Command for Parity Status Register

| START 1'b0 | MODE 1'b0 | DIR (R/W) 1'b0 | RANDOM 1'b1 | ADDRESS | STOP 1'b1 |
|---|---|---|---|---|---|

FIG. 30D

4. Read Data for Parity Status Register

| START 1'b0 | MODE 1'b0 | DATA 22'b00000000000000000000000 | STOP 1'b1 |
|---|---|---|---|

DEVICE INCLUDING SINGLE WIRE INTERFACE AND DATA PROCESSING SYSTEM INCLUDING THE SAME

CROSS-REFERENCE TO RELATED APPLICATIONS

This application claims priority under 35 U.S.C. §119(e) to U.S. provisional patent application No. 62/141,924 filed on Apr. 2, 2015, and under 35 U.S.C. §119(a) to Korean Patent Application No. 10-2015-0099858 filed on Jul. 14, 2015, the entire contents of each of which are hereby incorporated by reference.

BACKGROUND

Embodiments of inventive concepts relate to an integrated circuit (IC), and more particularly, to a master device and a slave device that can communicate with each other using a single wire interface and a data processing system including the devices.

In telecommunication or computer science, serial communication is a process of transmitting data bit by bit through a communication channel or computer bus, for example. Serial communication is contrasted with parallel communication in which multiple bits are simultaneously transmitted through a link having a plurality of parallel channels. Serial communication may be used in long-haul communication and most of the computer networks, for example.

Many communication systems are designed to connect two ICs to each other on a same printed circuit board (PCB). The more pins an IC has, the more expensive the IC. In order to reduce the number of pins in a package, a serial bus is usually used for data transmission in ICs when communication speed is not important. Examples of such a low-cost serial bus include serial peripheral interface (SPI) and inter-integrated circuit ($I^2C$).

SPI is synchronous serial communication interface usually used for short-distance communication, primarily in embedded systems. SPI may use three or four pins, which are many. In addition, there are an output driver and an input buffer connected to each of the pins, which leads to an increase of the price of chips.

$I^2C$ is a multi-master, multi-slave, single-ended, serial computer bus invented by Philips Semiconductor (now NXP Semiconductor). $I^2C$ is used for attaching low-speed peripherals to motherboards, embedded systems, and mobile telephones. $I^2C$ uses two bidirectional open-drain lines, that is, a serial data line (SDA) and a serial clock line (SCL), which are pulled up by resistors. Since $I^2C$ transmit serial data using a serial clock in order to synchronize two connected devices with each other, it consumes a lot of power. Additionally, capacitance in an $I^2C$ system may slow operations.

SUMMARY

According to some embodiments of inventive concepts, there is provided a master device which communicates with a slave device, the master device includes a single pad configured to communicate a command frame including an address and a data frame including data with the slave device via a single wire; and a processing circuit configured to generate an oversampling clock signal from a clock signal, to perform a synchronization process for selecting one of a plurality of clock phases of the oversampling clock signal, and to perform a sampling process for sampling an each bit value included in the data frame transmitted from the slave device using a clock phase at the same position as the clock phase selected during the synchronization process. Each of the command frame and the data frame may include a start bit value and a stop bit value and the processing circuit configured to perform the synchronization process on the start bit value.

In exemplary embodiments in accordance with principles of inventive concepts, the processing circuit may include a sync detection circuit including at least two flip-flops and a data processing circuit. The sync detection circuit configured to generate a plurality of clock phase selection signals related to the selected clock phase in each period of the oversampling clock signal using the at least two flip-flops and the data processing circuit configured to sample the each bit value included in the data frame in each period of the oversampling clock signal using a clock phase related to the plurality of clock phase selection signals.

In exemplary embodiments in accordance with principles of inventive concepts the oversampling clock signal is a 4× oversampling clock signal or a 2× oversampling clock signal.

In exemplary embodiments in accordance with principles of inventive concepts the single wire may not include a clock line configured to transmit the clock signal to the slave device. The clock signal used in the master device may have the same frequency as a clock signal used in the slave device.

In exemplary embodiments in accordance with principles of inventive concepts the master device may further include a pull-up resistor configured to control connection between a voltage supply line and the single pad in response to a pull-up resistor enable signal and an output driver connected to the single pad.

In exemplary embodiments in accordance with principles of inventive concepts the master device may further include a control circuit configured to activate the pull-up resistor enable signal when the stop bit value included in the command frame is transmitted to the single pad through the output driver. The master device may further include a frame generator configured to generate the command frame including a parity bit.

In exemplary embodiments in accordance with principles of inventive concepts, there is provided a slave device which communicates with a master device. The slave device includes a single pad configured to communicate a command frame including an address and a data frame including data with the master device via a single wire; and a processing circuit configured to generate an oversampling clock signal from a clock signal, to select one clock phase from among a plurality of clock phases of the oversampling clock signal, and to sample an each bit value included in the data frame transmitted from the master device using the one clock phase. The single wire may not include a clock line that transmits the clock signal.

In exemplary embodiments in accordance with principles of inventive concepts the slave device may further include a pull-up resistor configured to control connection between a voltage supply line and the single pad in response to a pull-up resistor enable signal and an output driver connected to the single pad.

In exemplary embodiments in accordance with principles of inventive concepts, there is provided a data processing system including a master device including a first single pad, a slave device including a second single pad and a processing circuit connected to the second single pad, and a single wire connected between the first single pad and the second single pad. The processing circuit configured to generate an oversampling clock signal from a clock signal, may select one of a plurality of clock phases of the oversampling clock signal and sample an each bit value included in a data frame transmitted from the master device using the selected clock phase.

In exemplary embodiments in accordance with principles of inventive concepts a master device that communicates with a slave device, include a processing circuit configured to communicate through an asynchronous serial link with the slave device; and the processing circuit configured to communicate a command frame and a data frame via the asynchronous serial link, wherein the command frame includes a burst frame and a random frame allowing burst transmission of stream data from the master device to the slave device.

In exemplary embodiments in accordance with principles of inventive concepts a master device includes a processing circuit, wherein the processing circuit is configured to generate an oversampling clock signal from a clock signal, to perform a synchronization process for selecting one of a plurality of clock phases of the oversampling clock signal, and to perform a sampling process for sampling each bit value included in the data frame transmitted from the slave device using a clock phase at the same position as the clock phase selected during the synchronization process.

In exemplary embodiments in accordance with principles of inventive concepts a master device includes a processing circuit that includes a sync detection circuit; and a data processing circuit, wherein the sync detection circuit configured to generate a plurality of clock phase selection signals related to the selected clock phase in each period of the oversampling clock signal and the data processing circuit configured to sample the each bit value included in the data frame in the each period of the oversampling clock signal using a clock phase related to the plurality of clock phase selection signals.

In exemplary embodiments in accordance with principles of inventive concepts a master device includes a pull-up resistor configured to control connection between a voltage supply line and a single pad through which asynchronous serial communication flows in response to a pull-up resistor enable signal; and an output driver connected to the single pad.

In exemplary embodiments in accordance with principles of inventive concepts a master device includes a control circuit configured to activate the pull-up resistor enable signal when a stop bit value included in the command frame is transmitted to the single pad through the output driver.

BRIEF DESCRIPTION OF THE DRAWINGS

The above and other features and advantages of inventive concepts will become more apparent by describing in detail exemplary embodiments thereof with reference to the attached drawings in which:

FIG. 2 is a diagram of a command frame format for a burst operation in a protocol according to some embodiments of inventive concepts;

FIG. 3 is a diagram of a command frame format for a random operation in a protocol according to some embodiments of inventive concepts;

FIG. 4 is a diagram of a data frame format in a protocol according to some embodiments of inventive concepts;

FIG. 7 is a diagram for explaining a mode field of a frame illustrated in FIG. 2, 3, or 4;

FIG. 8 is a diagram for explaining a direction field of a frame illustrated in FIG. 2 or 3;

FIG. 9 is a diagram for explaining a random field of a frame illustrated in FIG. 2 or 3;

FIG. 10 is a diagram for explaining an address field of a frame illustrated in FIG. 2 or 3;

FIG. 11 is a diagram for explaining a burst field of a frame illustrated in FIG. 2;

FIG. 12 is a diagram for explaining a burst length field of a frame illustrated in FIG. 2;

FIGS. 29A to 29D are diagrams of frame formats in a parity enabling process in a protocol according to some embodiments of inventive concepts;

FIGS. 30A to 30D are diagrams of frame formats in a parity disabling process in a protocol according to some embodiments of inventive concepts;

DETAILED DESCRIPTION OF THE EMBODIMENTS

Figure 1:
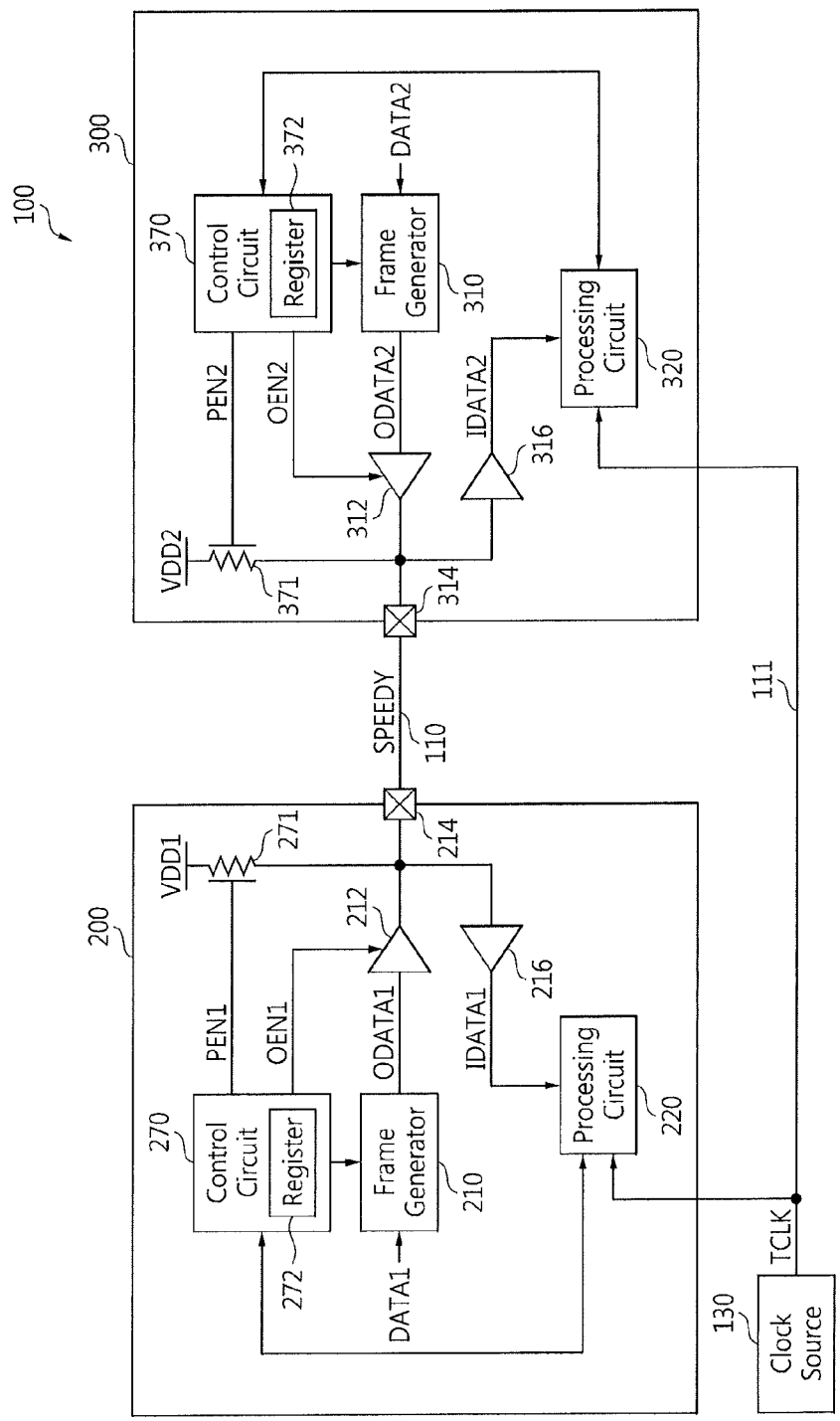
FIG. 1 is a s block diagram of a data processing system according to some embodiments of inventive concepts.

Inventive concepts now will be described more fully hereinafter with reference to the accompanying drawings, in which embodiments of the inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system 100 according to some embodiments of inventive concepts. The data processing system 100 may include a master device 200 and a slave device 300 which communicate a transmission frame SPEEDY with each other through a single wire 110. Transmission frame SPEEDY may be as described in greater detail below in the description related to exemplary embodiments.

The data processing system 100 may also include a clock source 130 which provides a clock signal TCLK for the master device 200 and the slave device 300. The single wire 110 does not include a clock line for transmitting the clock signal TCLK. In other words, in exemplary embodiments the clock signal TCLK output from the clock source 130 may be transmitted to the slave device 300 through a clock line 111 independent from the single wire 110. The clock source 130 may be implemented as a temperature compensated crystal oscillator (TCXO) or a crystal oscillator, for example.

Figure 35:
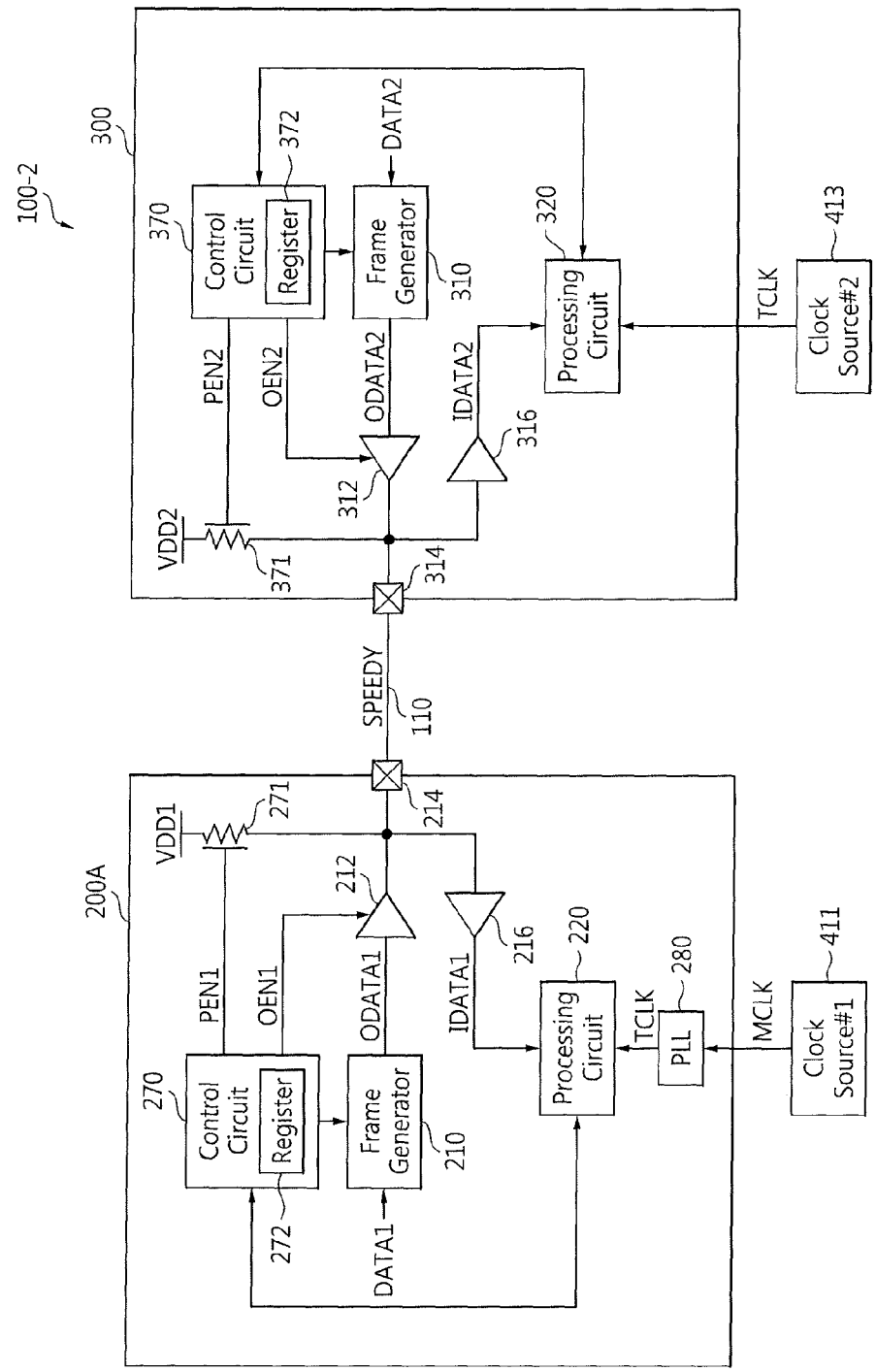
FIG. 35 is a block diagram of a data processing system according to further embodiments of inventive concepts.

The clock signal TCLK provided for the master device 200 is called a "master clock signal" and the clock signal TCLK provided for the slave device 300 is called a "slave clock signal". In exemplary embodiments, the clock source 130 for a master clock signal may be the same as the clock source 130 for a slave clock signal. However, as shown in FIG. 35, a clock source 411 of a master clock signal MCLK may be different than a clock source 413 of the slave clock signal TCLK. The clock signals TCLK respectively provided for the processing circuits 220 and 230 have the same frequency.

The data processing system 100 may be a personal computer (PC) or a mobile computing device. The mobile computing device may be a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book.

The single wire 110 may be a bidirectional serial bus that can transmit a digital stream, that is, a sequence of bits. The single wire 110, which transfers a command frame for address transmission and a data frame for data transmission in a protocol defined according to some embodiments of inventive concepts, may be connected between one first pad 214 of the master device 200 and one second pad 314 of the slave device 300. In exemplary embodiments, a frame is a digital data transmission unit and may include a sequence of bits or symbols. Single wire 110 may be implemented as an electrical transmission line, for example, a microstrip manufactured using printed circuit board (PCB) technology, but inventive concepts are not restricted thereto.

When the master device 200 according to the embodiments of inventive concepts is used, the number of pads is reduced as compared to a conventional master device which uses inter-integrated circuit (I²C) bus interfacing or serial peripheral interface (SPI) bus interfacing. In addition, when the slave device 300 according to the embodiments of inventive concepts is used, the number of pads is reduced as compared to a conventional slave device which uses I²C bus interfacing or SPI bus interfacing. In exemplary embodiments, a pad may be a contact pad or a pin, for example. Unlike the I²C bus interfacing and SPI bus interfacing, the single wire 110 does not include a clock line for transmitting the clock signal TCLK.

When the device 200 or 300 is a die and the number of pads in the die 200 or 300 is decreased, the size and power consumption of the die 200 or 300 is also decreased. As a result, the manufacturing cost of the die 200 or 300 is also decreased. That is, because, in exemplary embodiments in accordance with principles of inventive concepts, the die 200 or 300 is formed in a smaller area of silicon than conventional ones, the price competitiveness of the die 200 or 300 increases. Device 200 or 300 may be implemented in an IC, a system on chip (SoC), or a package, for example.

The master device 200 may be a controller circuit or a processor which can control the slave device 300. For example, the master device 200 may be implemented as a baseband modem processor chip, a chip which can function as both a modem and an application processor (AP), an AP, or a mobile AP, but inventive concepts are not restricted to these examples.

The slave device 300 may implemented as a radio frequency IC (RFIC), a connectivity chip, a sensor, a fingerprint recognition chip, a power management IC, a power supply module, a digital display interface chip, a display driver IC, or a touch screen controller, but inventive concepts are not restricted to these examples.

For example, the RFIC may include at least one connectivity chip. The connectivity chip may include a chip for mobile communication, a chip for wireless local area network (WLAN), a chip for Bluetooth communication, a chip for global navigation satellite system (GNSS) communication, a chip for processing a frequency modulation (FM) audio signal/video signal, a chip for near field communication (NFC), and/or a chip for Wi-Fi communication, but inventive concepts are not restricted to these examples.

The master device 200 may include a first frame generator 210, a first output driver 212, the first pad 214, a first input buffer 216, a first processing circuit 220, a first control circuit 270, and a first pull-up resistor 271.

The first frame generator 210 may generate a command frame for transmitting an address according to the control of the first control circuit 270. The command frame may be classified as a burst command frame or a random command frame.

FIG. 2 is a diagram of a command frame format for a burst operation in a protocol according to some embodiments of inventive concepts. Referring to FIG. 2, a command frame format CFFB for the burst operation may include a plurality of fields START, MODE, DIR(R/W), RANDOM, ADDRESS, BURST, BURST LENGTH, and STOP. The fields START, MODE, DIR(R/W), RANDOM, ADDRESS, BURST, BURST LENGTH, and STOP will be described in greater detail with reference to FIGS. 5 through 12. The number of bits included in each of the fields START, MODE, DIR(R/W), RANDOM, ADDRESS, BURST, BURST LENGTH, and STOP is just an example and inventive concepts are not restricted to the number of bits included in the fields START, MODE, DIR(R/W), RANDOM, ADDRESS, BURST, BURST LENGTH, and STOP. In exemplary embodiments, a bit may have one of two values (for example, 1 (or logic 1) or 0 (or logic 0)). Hereinafter, a value of a bit is referred to as a bit value.

FIG. 3 is a diagram of a command frame format for a random operation in a protocol according to some embodiments of inventive concepts. Referring to FIG. 3, a command frame format CFFR for the random operation may include a plurality of fields START, MODE, DIR(R/W), RANDOM, ADDRESS, and STOP. The fields START, MODE, DIR(R/W), RANDOM, ADDRESS, and STOP will be described in greater detail with reference to FIGS. 5 through 12. The number of bits included in each of the fields START, MODE, DIR(R/W), RANDOM, ADDRESS, and STOP is just an example and inventive concepts is not restricted to the number of bits included in the fields START, MODE, DIR(R/W), RANDOM, ADDRESS, and STOP.

To write first data DATA1 to the slave device 300, the first frame generator 210 may generate a first output frame ODATA1 including the first data DATA1.

FIG. 4 is a diagram of a data frame format DFF in a protocol according to some embodiments of inventive concepts. The data frame format DFF may include a plurality of fields START, MODE, DATA, and STOP. The fields START, MODE, DATA, and STOP will be described in greater detail with reference to FIGS. 5 through 12. The number of bits included in each of the fields START, MODE, DATA, and STOP is just an example and inventive concepts are not restricted to the number of bits included in the fields START, MODE, DATA, and STOP. The data field DATA may include 8, 16, 22 or 32 bits, but the number of bits included in the data field DATA may be variously changed in different embodiments.

The first output driver 212 may drive each bit (or each bit value) included in the first output frame ODATA1 (for example, a command frame or a data frame) to the first pad 214 in response to a first output enable signal OEN1. The first pad 214 may output the first output frame ODATA1 as the transmission frame SPEEDY to the single wire 110.

The first input buffer 216 may buffer the transmission frame SPEEDY, which has been output from the slave device 300 and received through the first pad 214, and may transmit a first buffered frame IDATA1 to the first processing circuit 220 bit by bit. The first buffered frame IDATA1 may be data that has been read from the slave device 300.

When processing the first buffered frame IDATA1, the first processing circuit 220 may generate an oversampling clock signal from the clock signal TCLK, may select one clock phase from among clock phases of the oversampling clock signal (for example, during synchronization), and may sample a bit value included in the first buffered frame IDATA1 using a clock phase existing at the same position as the selected clock phase in every period of the oversampling clock signal.

For example, each sampled bit value may be stored in a memory device (not shown) which can be accessed by the master device 200, but inventive concepts are not restricted to the current embodiments. The memory device may be implemented inside or outside the master device 200 and may be formed of volatile memory like dynamic random access memory (DRAM) or non-volatile memory like flash-based memory, for example.

The first control circuit 270 may generate the first output enable signal OEN1 for controlling the enable of the first output driver 212 and a first pull-up resistor enable signal PEN1 for controlling a first pull-up resistor 271. The enabling/disabling timings of the first output enable signal OEN1 and the first pull-up resistor enable signal PEN1 will be described in greater detail with reference to the timing chart illustrated in FIG. 25 and/or FIG. 26.

The first control circuit 270 may include a register 272 which stores control values for controlling an activation period of the first pull-up resistor enable signal PEN1. Although the register 272 is disposed within the first control circuit 270 in the embodiments illustrated in FIG. 1, the register 272 may be formed outside the first control circuit 270 in other embodiments. The first control circuit 270 may control the activation period of the first pull-up resistor enable signal PEN1 using the control values stored in the register 272.

The first pull-up resistor 271 may be connected or disconnected between a first voltage line (or a first voltage node) supplying a first operating voltage VDD1 and the first pad 214 in response to the first pull-up resistor enable signal PEN1. For example, when the first pull-up resistor enable signal PEN1 is activated, the first pull-up resistor 271 may be connected between the first voltage line and the first pad 214 and when the first pull-up resistor enable signal PEN1 is deactivated, the first pull-up resistor 271 may disconnect the first voltage line from the first pad 214. In exemplary embodiments, the activation may refer to transition from a low level (or logic 0) to a high level (or logic 1) and the deactivation may refer to transition from the high level to the low level, but it may be vice versa in other embodiments.

The slave device 300 may include a second frame generator 310, a second output driver 312, a second pad 314, a second input buffer 316, a second processing circuit 320, a second control circuit 370, and a second pull-up resistor 371.

The second frame generator 310 may generate an error bit, a status bit, or a data frame for data transmission according to the control of the second control circuit 370. When the slave device 300 transmits second data DATA2 to the master device 200, the second frame generator 310 may generate a second output frame ODATA2 including the second data DATA2. For example, the second data DATA2 may be read data when viewed from the master device 200, but inventive concepts are not restricted to the current embodiments.

For example, the second data DATA2 may be data read from a memory (not shown) of the slave device 300 in response to a command frame output from the master device 200. The memory may be volatile or non-volatile memory formed inside or outside the slave device 300. The memory may be fixed at or removable from the slave device 300. The second output frame ODATA2 may have a format the same as or similar to the data frame format DFF illustrated in FIG. 4.

The second output driver 312 may drive each bit (or each bit value) included in the second output frame ODATA2 to the second pad 314 in response to a second output enable signal OEN2. The second pad 314 may output the second output frame ODATA2 as the transmission frame SPEEDY to the single wire 110.

The second input buffer 316 may buffer the transmission frame SPEEDY which has been output from the master device 200 and received through the second pad 314 and may transmit a second buffered frame IDATA2 to the second processing circuit 320 bit by bit.

The second processing circuit 320 may generate an oversampling clock signal from the slave clock signal TCLK, may select one clock phase from among clock phases of the oversampling clock signal, and may sample a bit value included in the second buffered frame IDATA2 using a clock phase existing at the same position as the selected clock phase in every period of the oversampling clock signal.

When data sampled by the second processing circuit 320 is data (for example, a write command or a read command) included in a command frame, the second processing circuit 320 may generate write control signals for a write operation related to the write command or read control signals for a read operation related to the read command.

The second control circuit 370 may generate the second output enable signal OEN2 for controlling the enable of the second output driver 312 and a second pull-up resistor enable signal PEN2 for controlling a second pull-up resistor 371. The enabling/disabling timings of the second output enable signal OEN2 and the second pull-up resistor enable signal PEN2 will be described in greater detail with reference to FIG. 25 and/or FIG. 26.

The second control circuit 370 may include a register 372 that stores control values for controlling an activation period of the second pull-up resistor enable signal PEN2. Although the register 372 is disposed within the second control circuit 370 in the embodiments illustrated in FIG. 1, the register 372 may be formed outside the second control circuit 370 in other embodiments. The second control circuit 370 may control the activation period of the second pull-up resistor enable signal PEN2 using the control values stored in the register 372.

The second pull-up resistor 371 may be connected or disconnected between a second voltage line supplying a second operating voltage VDD2 and the second pad 314 in response to the second pull-up resistor enable signal PEN2. For instance, when the second pull-up resistor enable signal PEN2 is activated, the second pull-up resistor 371 may be connected between the second voltage line and the second pad 314. When the second pull-up resistor enable signal PEN2 is deactivated, the second pull-up resistor 371 may disconnect the second voltage line from the second pad 314. The level of the second operating voltage VDD2 and the level of the first operating voltage VDD1 may be the same or different each other.

The clock source 130 may provide the clock signal TCLK for the master device 200 and the slave device 300. For example, each of the first processing circuit 220 and the second processing circuit 320 may generate an oversampling clock signal using the clock signal TCLK having the same frequency. In other words, the first processing circuit 220 and the second processing circuit 320 use the clock signal TCLK having the same frequency as a source clock signal, and therefore, a frequency offset between the first processing circuit 220 and the second processing circuit 320 may be eliminated in embodiments in accordance with principles of inventive concepts.

Figure 5:
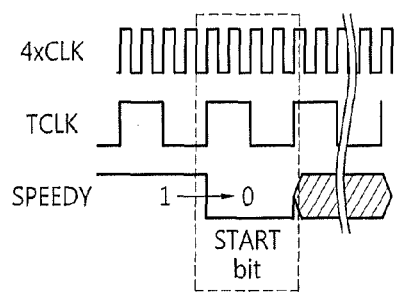
FIG. 5 is a diagram for explaining a start field of a frame illustrated in FIG. 2, 3, or 4.

FIG. 5 is a diagram for explaining the start field START of a frame illustrated in FIG. 2, 3, or 4. Referring to FIG. 5, a start bit of the start field START is one bit. When a start bit value of the start field START in the transmission frame SPEEDY transits, or transitions, from "1" to "0", it indicates the start of transmission of data, that is, the transmission frame SPEEDY. In exemplary embodiments, "1" refers to a high level or logic 1 and "0" refers to a low level or logic 0.

Figure 6:
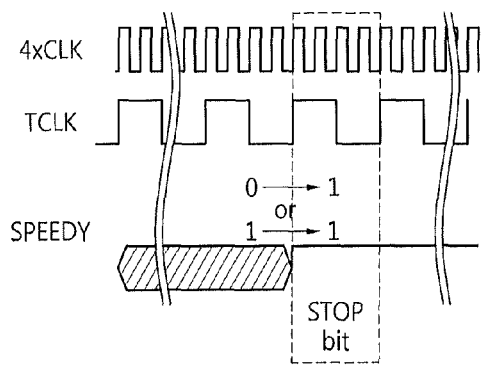
FIG. 6 is a diagram for explaining a stop field of a frame illustrated in FIG. 2, 3, or 4.

FIG. 6 is a diagram for explaining the stop field STOP of a frame illustrated in FIG. 2, 3, or 4. Referring to FIG. 6, a stop bit of the stop field STOP is one bit. When a stop bit value of the stop field STOP in the transmission frame SPEEDY is "1", it indicates the stop of transmission of data, that is, the transmission frame SPEEDY. When the stop bit value of the stop field STOP in the transmission frame SPEEDY is maintained at "1", it also indicates the stop of transmission of data, that is, the transmission frame SPEEDY. A value of a bit immediately before the stop bit of the stop field STOP may be "0" or "1". Although an oversampling clock signal is 4×CLK in the embodiments illustrated in FIGS. 5 and 6, this is just an example embodiment and inventive concepts are not limited thereto.

FIG. 7 is a diagram for explaining the mode field MODE of a frame illustrated in FIG. 2, 3, or 4. Referring to FIG. 7, a mode bit of the mode field MODE is one bit. The mode bit may indicate whether the transmission frame SPEEDY is a command frame for a command phase or a data frame for a data phase. For example, a mode bit value of the mode field MODE may be set to "0" in the command frame format CFFB or CFFR illustrated in FIG. 2 or 3 and may be set to "1" in the data frame format DFF illustrated in FIG. 4.

FIG. 8 is a diagram for explaining the direction field DIR(R/W) of a frame illustrated in FIG. 2 or 3. Referring to FIG. 8, an indication bit of the direction field DIR(R/W) is one bit. For example, an indication bit value of the direction field DIR(R/W) may be set to "0" for a read operation READ and may be set to "1" for a write operation WRITE.

Figure 25:
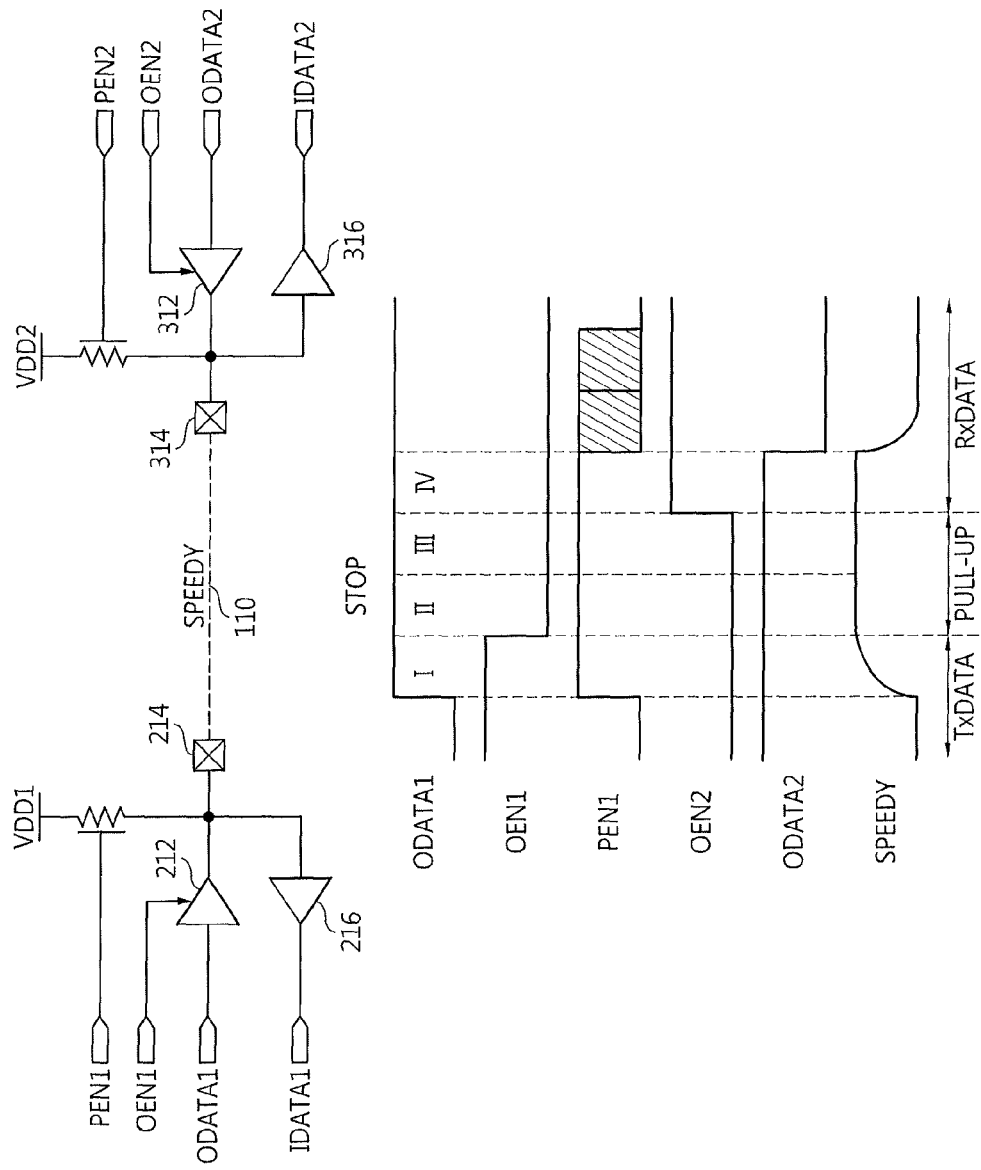
FIG. 25 is a timing chart of signals in a process of controlling a dynamic pull-up resistor included in a device which performs 4× oversampling.
Figure 26:
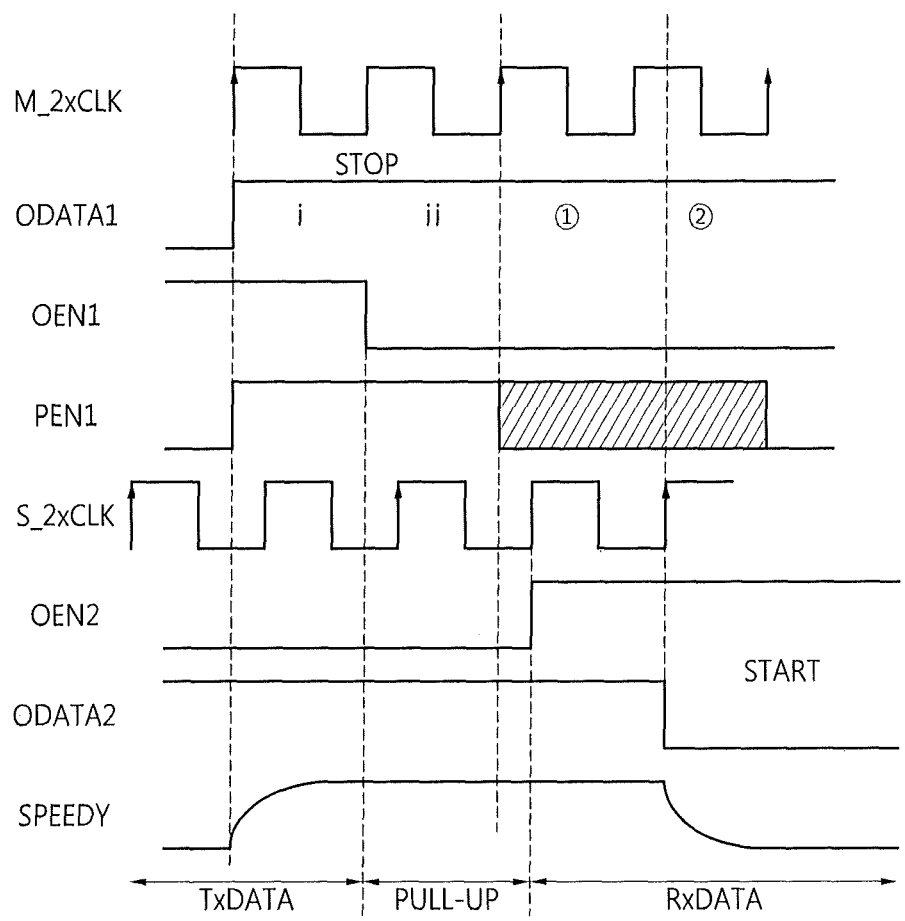
FIG. 26 is a timing chart of signals in a process of controlling a dynamic pull-up resistor included in a device which performs 2× oversampling.

For example, when a frame generated by the master device 200 is a command frame and the indication bit value of the direction field DIR(R/W) is set to "0", the slave device 300 may perform direction change based on the frame. In exemplary embodiments, the "direction change" may refer to an operation change performed by the slave device 300 to transmit a data frame including read data to the master device 200. That is, the slave device 300 may change from a reception mode for receiving a command frame into a transmission mode for transmitting a data frame. As shown in FIGS. 25 and 26, the direction change may be determined depending on the level of each of the output enable signals OEN1 and OEN2.

However, when a frame generated by the master device 200 is a command frame and the direction bit value of the direction field DIR(R/W) is set to "1", the slave device 300 does not perform the direction change in response to the frame. That is, in exemplary embodiments the slave device 300 may remain in the reception mode to receive data frame.

FIG. 9 is a diagram for explaining the random field RANDOM of a frame illustrated in FIG. 2 or 3. Referring to FIG. 9, an indication bit of the random field RANDOM is one bit. The indication bit of the random field RANDOM may indicate whether address bits (for example, ADDRESS [8:0] in FIG. 10) of the address field ADDRESS form a random address or a burst address. An indication bit value of the random field RANDOM may be set to "0" in the command frame format CFFB illustrated in FIG. 2 and may be set to "1" in the command frame format CFFR illustrated in FIG. 3.

FIG. 10 is a diagram for explaining the address field ADDRESS of a frame illustrated in FIG. 2 or 3. Referring to FIG. 10, the address bits in the address field ADDRESS may be 9-bits. When the address bits are 9-bits, address spaces may support 512 destinations. Although the number of address bits in the address field ADDRESS is nine (9) in the embodiments illustrated in FIG. 10, the number of address bits in the address field ADDRESS may be variously changed in accordance with principles of inventive concepts.

FIG. 11 is a diagram for explaining the burst field BURST of a frame illustrated in FIG. 2. Referring to FIG. 11, the burst field BURST may have 2-bits: "00", "01", "10", or "11" that indicate a burst type. For instance, "00" indicates a fixed-address burst as a fixed burst type FIXED; "01" indicates an incremental-address burst as an increment burst type INCREMENT; "10" indicates an extended special command as an extension burst type EXTENSION; and "11" indicates infinite data as a stream type STREAM. The master device 200 may use a write command having a large volume of data.

FIG. 12 is a diagram for explaining the burst length field BURST LENGTH of a frame illustrated in FIG. 2. Referring to FIG. 12, the burst length field BURST LENGTH has five indication bits [4:0], which may indicate the number of data transfers.

Figure 13A:
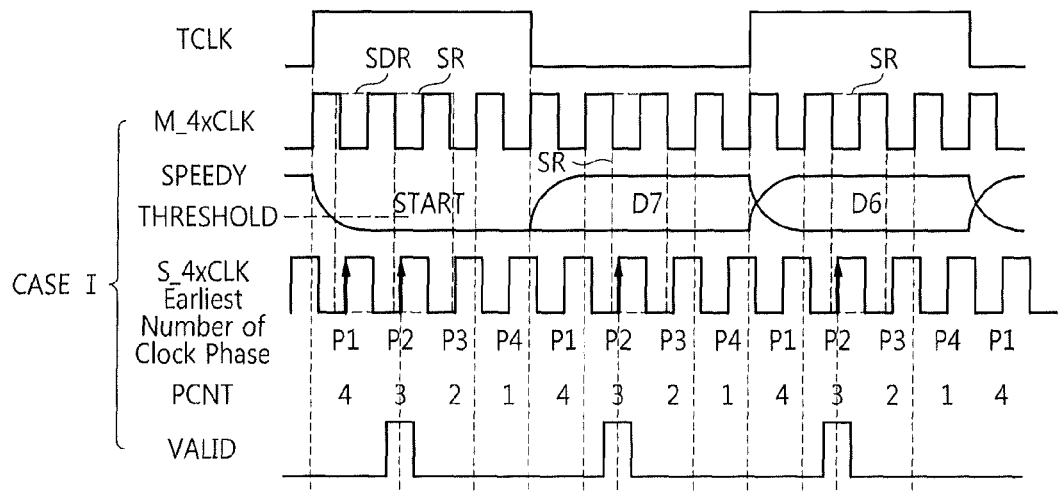
FIGS. 13A and 13B are timing charts of signals for explaining a synchronization process and a sampling process which are performed using a 4× oversampling clock signal according to some embodiments of inventive concepts.
Figure 13B:
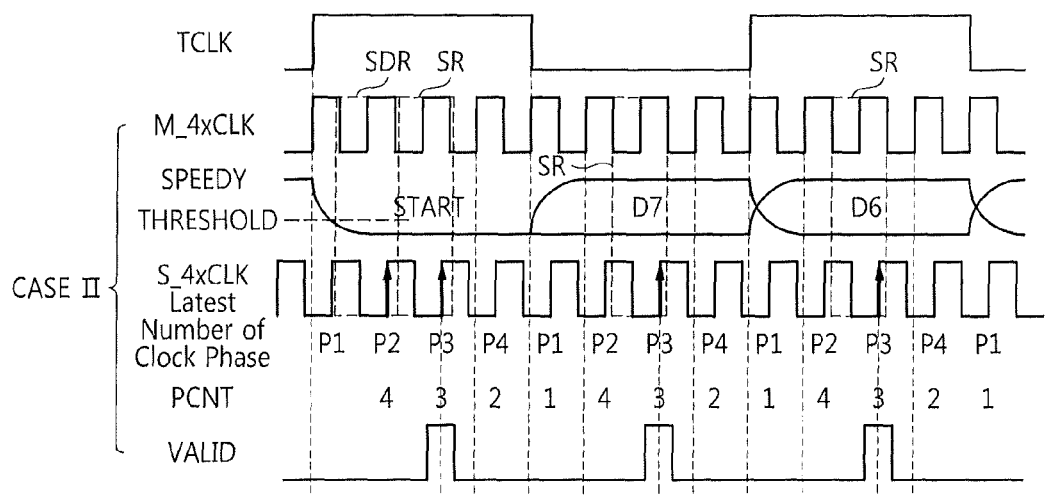
Figure 14:
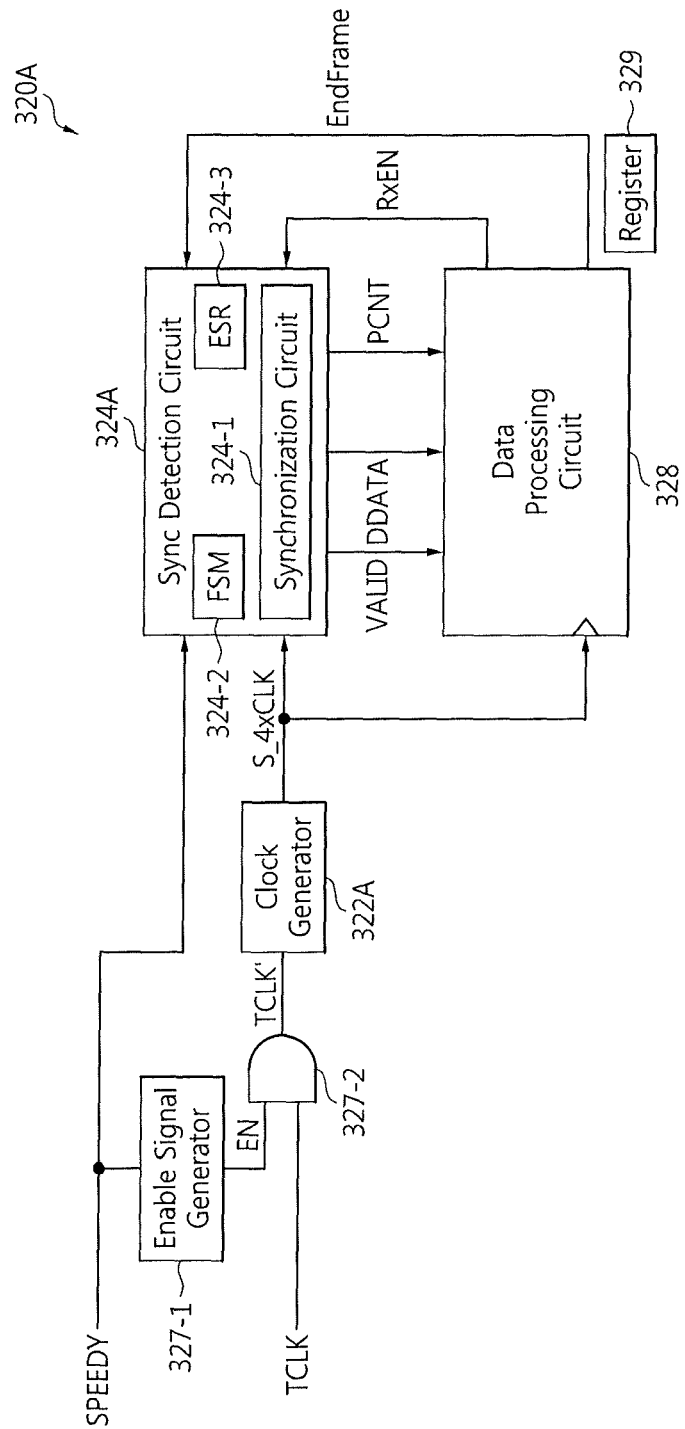
FIG. 14 is a block diagram of a second processing circuit included in a slave device illustrated in FIG. 1 according to some embodiments of inventive concepts.

FIGS. 13A and 13B are a timing chart of signals for explaining a synchronization process and a sampling process that are performed using a 4× oversampling clock signal according to some embodiments of inventive concepts. FIG. 14 is a block diagram of a second processing circuit 320A included in the slave device 300 illustrated in FIG. 1 according to some embodiments of inventive concepts.

Referring to FIGS. 1 through 14, apart from an enable signal generator 327-1 and a mask circuit 327-2, the structure and operations of the second processing circuit 320 of the slave device 300 are assumed to be the same as or similar to those of the first processing circuit 220 of the master device 200. FIGS. 13A, 13B and 14 show a 4× oversampling process.

The enable signal generator 327-1 may generate an enable signal EN using the transmission frame SPEEDY. The mask circuit 327-2 may control the transmission of the clock signal TCLK using the enable signal EN. In exemplary embodiments the mask circuit 327-2 may be implemented as an AND gate, but inventive concepts are not restricted thereto.

When the slave device 300 is in a sleep state, the enable signal generator 327-1 may generate the enable signal EN at a low level, and therefore, the mask circuit 327-2 may block the transmission of the clock signal TCLK. The structure and operations of the enable signal generator 327-1 will be described in greater detail with reference to FIG. 32.

Although the enable signal generator 327-1 and the mask circuit 327-2 that control the transmission of the clock signal TCLK are provided for a low-power operation in the embodiments illustrated in FIG. 14, they may be replaced with a frequency control circuit which can generates a clock signal TCLK' having a lower frequency than the clock signal TCLK. The frequency control circuit may generate the clock signal TCLK' having a lower frequency than the clock signal TCLK using the transmission frame SPEEDY when the slave device 300 is in the sleep state.

Because the transmission frame SPEEDY transferred from the transmitting device 200 or 300 through the single wire 110 is an asynchronous signal that does not include the clock signal TCLK, the receiving device 300 or 200 may include the processing circuit 320 or 220 which can perform a synchronization process and an oversampling process on the transmission frame SPEEDY. For example, the processing circuit 320 or 220 may newly perform the synchronization process on each transmission frame SPEEDY (for example, each command frame or each data frame).

When there is a difference (a worst phase difference in some occasions) between the phase of a master oversampling clock signal M_4×CLK used in the master device 200 and the phase of a slave oversampling clock signal S_4× CLK used in the slave device 300, FIGS. 13A and 13B show how to detect sync between two oversampling clock signals M_4×CLK and S_4×CLK and at which point each bit value included in data, that is, the transmission frame SPEEDY is safely sampled.

The processing circuit 220 or 320 may satisfy the following conditions in order to accurately sample each bit value included in data, for example, the transmission frame SPEEDY.

Firstly, the oversampling clock signals M_4×CLK and S_4×CLK may be generated based on the clock signal TCLK having the same frequency and they need to have the same frequency. In other words, when the oversampling clock signals M_4×CLK and S_4×CLK have the same frequency, no frequency offset problems occur.

Secondly, the processing circuit 220 or 320 can accurately sample each bit value included in the data, that is, the transmission frame SPEEDY safely from a phase offset and jitter when sampling the center of the bit value. When each bit value is sampled at a rising or positive edge of a sampling region SR as shown in FIGS. 13A and 13B, the bit value can be safely sampled.

Thirdly, the processing circuit 220 or 320 can clearly identify the start of the transmission frame SPEEDY and perform the synchronization process on the transmission frame SPEEDY using the start bit value of the start field START of the transmission frame SPEEDY.

In exemplary embodiments, when a write operation is performed on the slave device 300, the second processing circuit 320 can clearly identify the start of frames (for example, a command frame and a data frame) output from the master device 200 and perform the synchronization process on the frames using the start bit value of the start field START included in each of the frames.

When a read operation is performed on the slave device 300, the second processing circuit 320 can clearly identify the start of a command frame output from the master device 200 and perform the synchronization process on the command frame using the start bit value of the start field START included in the command frame. Thereafter, the first processing circuit 220 can clearly identify the start of a data frame output from the slave device 300 and perform the synchronization process on the data frame using the start bit value of the start field START included in the data frame. That is, the processing circuits 220 and 320 can clearly identify the start of a frame and perform the synchronization process on the frame.

Each of the processing circuits 220 and 320 may select a phase (for example, a second clock phase P2 in a first case CASEI in 13A or a third clock phase P3 in a second case CASEII in FIG. 13B) from among four clock phases P1 through P4 of the slave 4× oversampling clock signal S_4×CLK during the synchronization process and may safely and accurately sample each bit value included in the transmission frame SPEEDY using the selected clock phase (or a clock phase existing at the same position as the second clock phase P2 in the first case CASEI or the third clock phase P3 in the second case CASEII) in every period of the slave 4× oversampling clock signal S_4×CLK.

Each processing circuit 220 or 320 may newly perform the synchronization process on each transmission frame SPEEDY. Accordingly, each processing circuit 220 or 320 may newly select one of the four clock phases P1 through P4 of the slave 4× oversampling clock signal S_4×CLK for each transmission frame SPEEDY.

For a robust synchronization process, the processing circuits 220 and 320 may change a data phase as shown in the following examples.

When the master device 200 transfers data (that is, each bit value included in the transmission frame SPEEDY) synchronized with a rising edge of the master clock signal TCLK (or TCLK' in a normal state) to the slave device 300, the second processing circuit 320 may sample the data (that is, the bit value included in the transmission frame SPEEDY) using a rising edge of the slave clock signal TCLK (or TCLK' in a normal state). The slave 4× oversampling clock signal S_4×CLK may be used for the sampling.

In a case where the frequency of the master clock signal TCLK is the same as that of the slave clock signal TCLK, the distance between the master device 200 and the slave device 300 (for example, the wiring length of a PCB) is short, and the transmission speed of the transmission frame SPEEDY transferred from the master device 200 to the slave device 300 is slow; when the master device 200 transmits the data (that is, a bit value included in the transmission frame SPEEDY) to the slave device 300 at a rising edge of the master clock signal TCLK, the second processing circuit 320 may sample the data (that is, the bit value included in the transmission frame SPEEDY) using a falling or negative edge of the slave clock signal TCLK. In exemplary embodiments the slave 4× oversampling clock signal S_4×CLK may be used for the sampling.

For example, each of the processing circuit 220 and 320 may include a programmable memory (for example, 329 in FIG. 14) that stores information for changing a data phase. For example, the programmable memory may be implemented as a register which can be programmed by the control circuit 270 or 370, but inventive concepts is not restricted to the current embodiments.

Referring to FIG. 13A and FIG. 14, an example of the second processing circuit 320, that is, the second processing circuit 320A may include a clock generator 322A, a sync detection circuit 324A, and a second data processing circuit 328. The second processing circuit 320A may also include the register 329. For example, the register 329 may include first information for controlling a data phase and second information for controlling synchronization on/off of the sync detection circuit 324A. As described above, the first information may be used to select an edge of a clock signal for sampling or an edge of the slave 4× oversampling clock signal S_4×CLK. The second information may be used to control on/off of the synchronization process. The information may include at least one digital signal.

When the sync detection circuit 324A is turned on, the sync detection circuit 324A performs the synchronization process. When the sync detection circuit 324A is turned off, the sync detection circuit 324A does not perform the synchronization process. That is, in exemplary embodiments, when the sync detection circuit 324A is turned off, the transmission frame SPEEDY is transmitted as it is to the second data processing circuit 328.

The clock generator 322A may generate the slave 4× oversampling clock signal S_4×CLK using the slave clock signal TCLK' output from the mask circuit 327-2. As shown in FIGS. 13A and 13B, the slave 4× oversampling clock signal S_4×CLK may include four clock phases P1 through P4 in each period. The second processing circuit 320A may also include the enable signal generator 327-1 and the mask circuit 327-2. Operations of the enable signal generator 327-1 and the mask circuit 327-2 will be described in greater detail with reference to FIGS. 31 through 33.

The sync detection circuit 324A may select one clock phase from among four clock phases P1 through P4 of the slave 4× oversampling clock signal S_4×CLK in each period in order to sample a bit value included in the transmission frame SPEEDY. The sync detection circuit 324A may transmit a validity indication signal VALID, data DDATA, and a phase count PCNT to the second data processing circuit 328. The data DDATA may be the same as the transmission frame SPEEDY. The sync detection circuit 324A may include a synchronization circuit 324-1 and a finite-state machine (FSM) 324-2. The sync detection circuit 324A may also include a register 324-3. The register 324-3 may store error information or time-out information.

Figure 15:
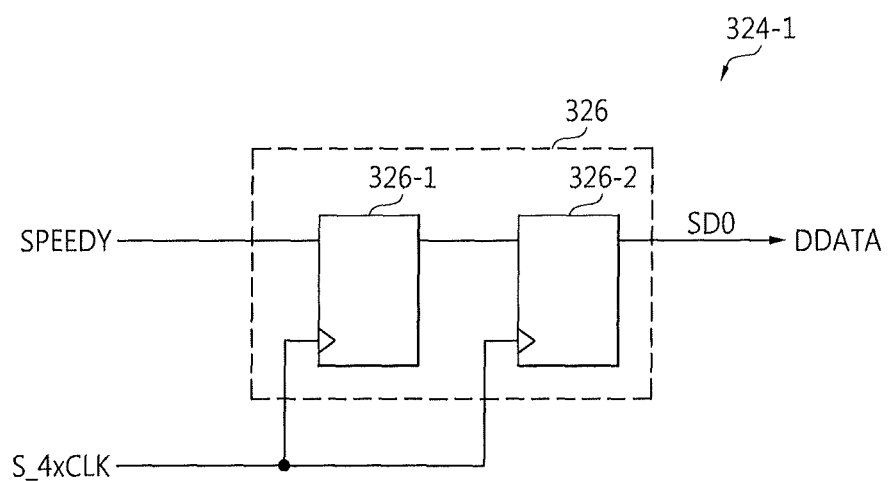
FIG. 15 is a bock diagram of a synchronization circuit included in a sync detection circuit illustrated in FIG. 14.

FIG. 15 is a bock diagram of the synchronization circuit 324-1 included in the sync detection circuit 324A illustrated in FIG. 14. Referring to FIGS. 13A through 15, the synchronization circuit 324-1 may include a plurality of flip-flops 326-1 and 326-2 for stable sampling. The first flip-flop 326-1 may sample a bit value included in the transmission frame SPEEDY in response to the slave 4× oversampling clock signal S_4×CLK. The second flip-flop 326-2 may sample the bit value output from the first flip-flop 326-1 and output a sampled bit value SD0 (=DDATA). In exemplary embodiments in accordance with principles of inventive concepts flip-flops 326-1 and 326-2 may together form a sampling circuit.

Figure 16:
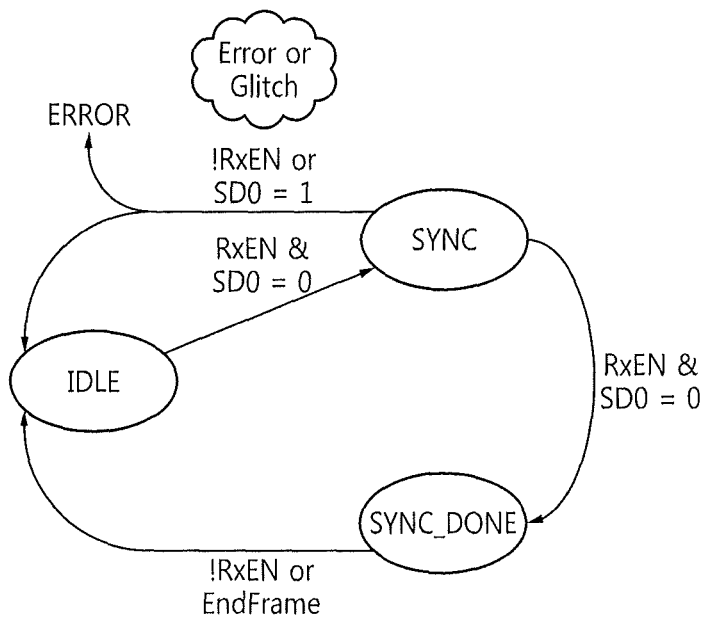
FIG. 16 is a state diagram of a finite-state machine (FSM), which is included in the sync detection circuit illustrated in FIG. 14 and performs the synchronization process using 4× oversampling.
Figure 17:
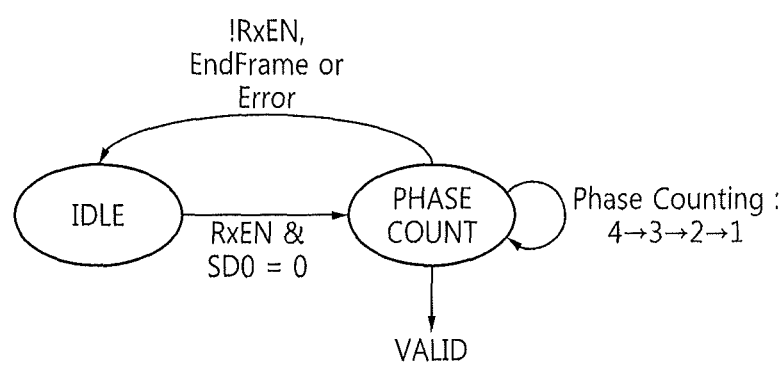
FIG. 17 is a state diagram for explaining a phase count operation of the FSM, which is included in the sync detection circuit illustrated in FIG. 14 and performs the synchronization process using 4× oversampling.

FIG. 16 is a state diagram of the FSM 324-2, which is included in the sync detection circuit 324A illustrated in FIG. 14 and performs the synchronization process using 4× oversampling. FIG. 17 is a state diagram for explaining a phase count operation of the FSM 324-2, which is included in the sync detection circuit 324A illustrated in FIG. 14 and performs the synchronization process using 4× oversampling.

Referring to FIGS. 13A through 17, the FSM 324-2 may generate the validity indication signal VALID and the phase count PCNT using the data SD0 (=DDATA) sampled by the synchronization circuit 324-1, a reception enable signal RxEN, and a frame end signal EndFrame.

It is assumed that the reception enable signal RxEN is activated to "1" when the slave device 300 is in reception mode as shown in FIG. 14 and is deactivated to "0" when the slave device 300 is in a transmission mode. It is also assumed that the frame end signal EndFrame is deactivated to "0" when the transmission of the transmission frame SPEEDY is not completed and is activated to "1" when the transmission of the transmission frame SPEEDY is completed. The phase count PCNT is assumed to be down-counted, like 4, 3, 2, and 1, sequentially in response to a rising edge of each of the clock phases P1 through P4 in a period of the slave 4× oversampling clock signal S_4×CLK. In other embodiments, the phase count PCNT may be up-counted, like 1, 2, 3, and 4, sequentially in response to a rising edge of each of the clock phases P1 through P4 in a period of the slave 4× oversampling clock signal S_4×CLK.

The synchronization circuit 324-1 may sample the start bit value of the start field START using the rising edge of the first clock phase P1 of the slave 4× oversampling clock signal S_4×CLK and may output the sampled bit value SD0 (=0). Since the sampled bit value SD0 is "0", the rising edge of the first clock phase P1 is included in a synchronization detection region SDR. The synchronization circuit 324-1 may perform synchronization in the synchronization detection region SDR. In FIGS. 13A and 13B, a threshold may indicate a value at which "0" may be detected.

The FSM 324-2 may transit from an idle state IDLE to a synchronization state SYNC in response to the sampled bit value SD0 (=0) at the first clock phase P1 and the reception enable signal RxEN(=1) activated. At such time, the FSM 324-2 may count the rising edge of the first clock phase P1 and may output "4" as the phase count PCNT.

When the reception enable signal RxEN which has been activated transits to "0" or the sampled bit value SD0 transits to "1" due to an error or glitch in the synchronization state SYNC, the FSM 324-2 may transit from the synchronization state SYNC to the idle state IDLE and may generate an error signal ERROR. A bit value corresponding to the error signal ERROR may be stored in the register 324-3.

In the synchronization state SYNC, the synchronization circuit 324-1 may sample the start bit value of the start field START using the rising edge of the second clock phase P2 of the slave 4× oversampling clock signal S_4×CLK and may output the sampled bit value SD0 (=0).

The FSM 324-2 may transit from the synchronization state SYNC to a synchronization-done state SYNC_DONE in response to the sampled bit value SD0 (=0) at the rising edge of the second clock phase P2 and the reception enable signal RxEN (=1) activated. In other words, when the sampled bit value SD0 at the rising edge of the first clock phase P1 and the sampled bit value SD0 at the rising edge of the second clock phase P2 are all "0", the FSM 324-2 may transit from the synchronization state SYNC to the synchronization-done state SYNC_DONE. At such time, the FSM 324-2 may count the rising edge of the second clock phase P2 and may output "3" as the phase count PCNT. When "3" is output as the phase count PCNT, the FSM 324-2 may generate the validity indication signal VALID activated.

The FSM 324-2 may count the rising edge of the third clock phase P3 and output "2" as the phase count PCNT and may count the rising edge of the fourth clock phase P4 and output "1" as the phase count PCNT. In other words, in exemplary embodiments the FSM 324-2 may generate the phase count PCNT that indicates a place of a current clock phase in a sequence of the four clock phases P1 through P4 in each period of the slave 4× oversampling clock signal S_4×CLK. In addition, the FSM 324-2 may generate the activated validity indication signal VALID indicating that the second clock phase P2 is the one for sampling a bit value included in the transmission frame SPEEDY in each period of the slave 4× oversampling clock signal S_4×CLK.

The second data processing circuit 328 may receive the slave 4× oversampling clock signal S_4×CLK, the validity indication signal VALID, the data DDATA, and the phase count PCNT and may sample a bit value (for example, D7 or D6) included in the data DDATA using the rising edge of the second clock phase P2 in each period of the slave 4× oversampling clock signal S_4×CLK. The validity indication signal VALID may have an activated pulse whenever the phase count PCNT is "3", but inventive concepts is not restricted to the current embodiments.

When the reception enable signal RxEN is not "1", that is, in case of !RxEN or when the reception of the transmission frame SPEEDY is completed; the FSM 324-2 may transit from the synchronization-done state SYNC_DONE to the idle state IDLE. When the reception enable signal RxEN is not "1" (that is, !RxEN), when the reception of the transmission frame SPEEDY is completed, or when an error occurs; the FSM 324-2 may transit from a phase count state PHASE COUNT to the idle state IDLE.

The second data processing circuit 328 may sample a bit value included in the data DDATA (=SPEEDY) output from the synchronization circuit 324-1 at each second clock phase P2 of the slave 4× oversampling clock signal S_4×CLK and may generate control signals for a write or read operation according to the sampling result.

The first case CASEI shown in FIG. 13A is a timing chart for explaining a process of selecting one clock phase (for example, P2) from among the clock phases P1 through P4 when the phase of the slave 4× oversampling clock signal S_4×CLK is the earliest one (for example, when the difference between the phase of the master 4× oversampling clock signal M_4×CLK and the phase of the slave 4× oversampling clock signal S_4×CLK is the least). The synchronization circuit 324-1 may select the second clock phase P2 from among the four clock phases P1 through P4 in each period of the slave 4× oversampling clock signal S_4×CLK and may output the activated validity indication signal VALID corresponding to the selection result to the second data processing circuit 328.

The second case CASEII shown in FIG. 13B is a timing chart for explaining a process of selecting one clock phase (for example, P3) from among the clock phases P1 through P4 when the phase of the slave 4× oversampling clock signal S_4×CLK is the latest one (for example, when the difference between the phase of the master 4× oversampling clock signal M_4×CLK and the phase of the slave 4× oversampling clock signal S_4×CLK is the greatest).

It is assumed that the synchronization circuit 324-1 samples the start bit value of the start field START using the rising edge of the first clock phase P1 of the slave 4× oversampling clock signal S_4×CLK and outputs the sampled bit value SD0 (=1). Because the sampled bit value SD0 is not "0", the rising edge of the first clock phase P1 is not included in the synchronization detection region SDR. The FSM 324-2 may count the rising edge of the first clock phase P1 and may not output the phase count PCNT, but inventive concepts are not restricted thereto. In other words, the phase count PCNT may be output when the sampled bit value SD0 is "0", but the output timing of the phase count PCNT may be changed in other embodiments.

The synchronization circuit 324-1 may sample the start bit value of the start field START using the rising edge of the second clock phase P2 of the slave 4× oversampling clock signal S_4×CLK and may output the sampled bit value SD0 (=0). Because the sampled bit value SD0 is "0", the rising edge of the second clock phase P2 is included in the synchronization detection region SDR.

The FSM 324-2 may transit from the idle state IDLE to the synchronization state SYNC in response to the sampled bit value SD0 (=0) at the second clock phase P2 and the reception enable signal RxEN(=1) activated. At this time, the FSM 324-2 may count the rising edge of the second clock phase P2 and may output "4" as the phase count PCNT.

When the reception enable signal RxEN which has been activated transits to "0" or the sampled bit value SD0 transits to "1" due to an error or glitch in the synchronization state SYNC, the FSM 324-2 may transit from the synchronization state SYNC to the idle state IDLE and may generate the error signal ERROR. A bit value corresponding to the error signal ERROR may be stored in the register 324-3.

In the synchronization state SYNC, the synchronization circuit 324-1 may sample the start bit value of the start field START using the rising edge of the third clock phase P3 of the slave 4× oversampling clock signal S_4×CLK and may output the sampled bit value SD0 (=0). The FSM 324-2 may transit from the synchronization state SYNC to the synchronization-done state SYNC_DONE in response to the sampled bit value SD0 (=0) at the rising edge of the third clock phase P3 and the reception enable signal RxEN (=1) activated. In other words, when the sampled bit value SD0 at the rising edge of the second clock phase P2 and the sampled bit value SD0 at the rising edge of the third clock phase P3 are all "0", the FSM 324-2 may transit from the synchronization state SYNC to the synchronization-done state SYNC_DONE. At such time, the FSM 324-2 may count the rising edge of the third clock phase P3 and may output "3" as the phase count PCNT. When "3" is output as the phase count PCNT, the FSM 324-2 may generate the validity indication signal VALID activated.

The FSM 324-2 may count the rising edge of the fourth clock phase P4 and output "2" as the phase count PCNT. In other words, the FSM 324-2 may generate the phase count PCNT that indicates a place of a current clock phase in a sequence of the four clock phases P1 through P4 in each period of the slave 4× oversampling clock signal S_4×CLK. In addition, the FSM 324-2 may generate the activated validity indication signal VALID indicating that the third clock phase P3 is the one for sampling a bit value included in the transmission frame SPEEDY in each period of the slave 4× oversampling clock signal S_4×CLK.

The second data processing circuit 328 may receive the slave 4× oversampling clock signal S_4×CLK, the validity indication signal VALID, the data DDATA, and the phase count PCNT and may sample a bit value (for example, D7 or D6) included in the data DDATA using the rising edge of the third clock phase P3 in each period of the slave 4× oversampling clock signal S_4×CLK. The validity indication signal VALID may have an activated pulse whenever the phase count PCNT is "3", but inventive concepts are not limited thereto.

When the reception enable signal RxEN is not "1", that is, in case of !RxEN or when the reception of the transmission frame SPEEDY is completed; the FSM 324-2 may transit from the synchronization-done state SYNC_DONE to the idle state IDLE. When the reception enable signal RxEN is not "1" (that is, !RxEN), when the reception of the transmission frame SPEEDY is completed, or when an error occurs; the FSM 324-2 may transit from the phase count state PHASE COUNT to the idle state IDLE.

The second data processing circuit 328 may sample a bit value included in the data DDATA (=SPEEDY) output from the synchronization circuit 324-1 at each third clock phase P3 of the slave 4× oversampling clock signal S_4×CLK and may generate control signals for a write or read operation according to the sampling result.

The synchronization circuit 324-1 may select the third clock phase P3 from among the four clock phases P1 through P4 in each period of the slave 4× oversampling clock signal S_4×CLK and may output the validity indication signal VALID corresponding to the selection result to the second data processing circuit 328. The second data processing circuit may sample a bit value included in the frame using the third clock phase P3 among the four clock phases P1 through P4 in each period of the slave 4× oversampling clock signal S_4×CLK based on the validity indication signal VALID and the phase count PCNT.

Figure 18:
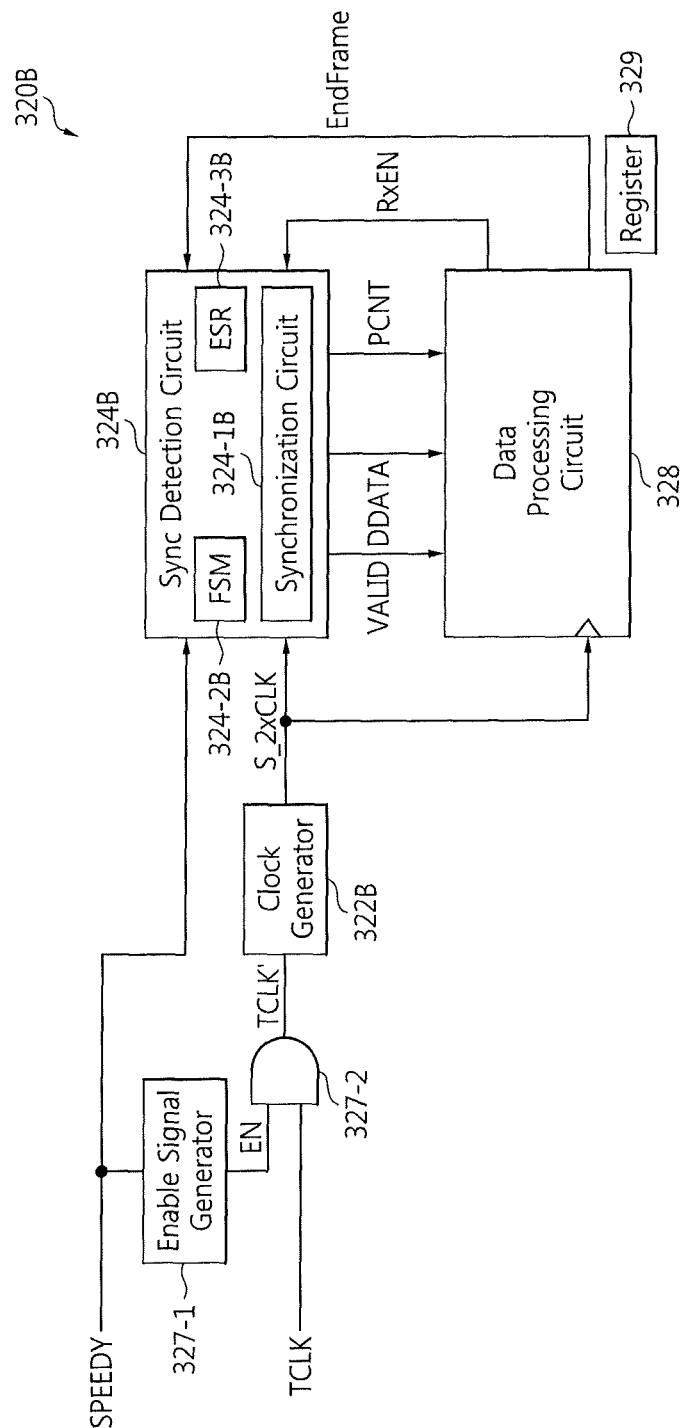
FIG. 18 is a block diagram of a second processing circuit included in the slave device illustrated in FIG. 1 according to other embodiments of inventive concepts.

FIG. 18 is a block diagram of a second processing circuit 320B included in the slave device 300 illustrated in FIG. 1 according to other exemplary embodiments in accordance with principles of inventive concepts. An example of the second processing circuit 320 illustrated in FIG. 1, that is, the second processing circuit 320B illustrated in FIG. 18, may include a clock generator 322B, a sync detection circuit 324B, and the second data processing circuit 328. The second processing circuit 320B may also include the register 329. The register 329 may include first information for controlling a data phase and second information for controlling on/off of the sync detection circuit 324B. As described above, the first information may be used to select a sampling edge and the second information may be used to control on/off of the synchronization process.

The clock generator 322B may generate a slave 2× oversampling clock signal S_2×CLK using the slave clock signal TCLK' output from the mask circuit 327-2. The second processing circuit 320B may also include the enable signal generator 327-1 and the mask circuit 327-2. The operations of the enable signal generator 327-1 and the mask circuit 327-2 will be described in greater detail with reference to FIGS. 31 through 33.

Figure 19:
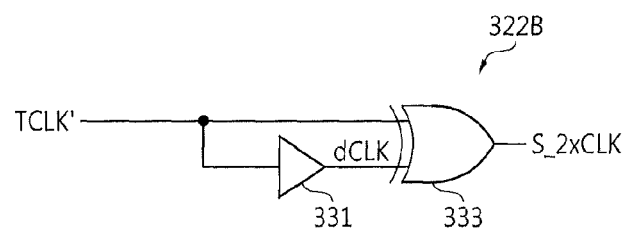
FIG. 19 is a diagram of a clock generator included in the processing circuit illustrated in FIG. 18 to generate a 2× oversampling clock signal according to some embodiments of inventive concepts.

FIG. 19 is a diagram of the clock generator 322B included in the second processing circuit 320B illustrated in FIG. 18 to generate the slave 2× oversampling clock signal S_2×CLK according to some embodiments of inventive concepts. Referring to FIG. 19, the clock generator 322B may include a delay circuit 331 and an exclusive OR (XOR) circuit 331. The delay circuit 331 may delay the slave clock signal TCLK'. The delay circuit 331 may be implemented as a delay buffer, but inventive concepts are not restricted thereto. The XOR circuit 333 may perform an XOR operation on the slave clock signal TCLK' and a delayed clock signal dCLK output from the delay circuit 331, thereby generating the slave 2× oversampling clock signal S_2×CLK.

Figure 20:
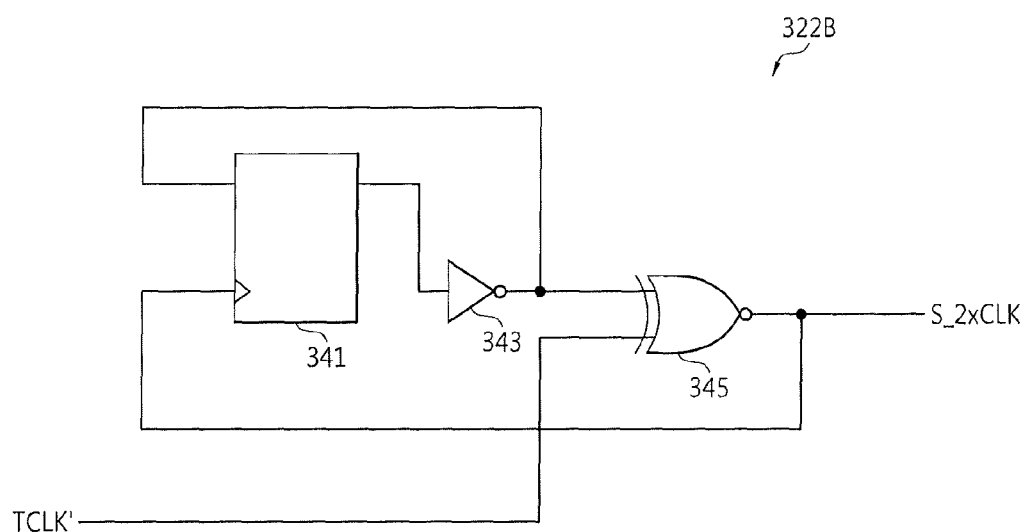
FIG. 20 is a diagram of the clock generator included in the processing circuit illustrated in FIG. 18 to generate a 2× oversampling clock signal according to other embodiments of inventive concepts.

FIG. 20 is a diagram of the clock generator 322B included in the second processing circuit 320B illustrated in FIG. 18 to generate the slave 2× oversampling clock signal S_2×CLK according to other embodiments of inventive concepts. Referring to FIG. 20, the clock generator 322B may include a flip-flop 341, an inverter 343, and an exclusive NOR (XNOR) circuit 345.

An output signal of the inverter 343 is provided (or fed back) as an input signal for the flip-flop 341 and an output signal (that is, the slave 2× oversampling clock signal S_2×CLK) of the XNOR circuit 345 is provided as a clock signal for the flip-flop 341. The inverter 343 inverts an output signal of the flip-flop 341. The XNOR circuit 345 may generate the slave 2× oversampling clock signal S_2× CLK by performing an XNOR operation on the output signal of the inverter 343 and the slave clock signal TCLK'.

The sync detection circuit 324B may select either of two clock phases of the slave 2× oversampling clock signal S_2×CLK in order to sample a bit value included in the transmission frame SPEEDY. The sync detection circuit 324B may transmit the validity indication signal VALID, the data DDATA, and the phase count PCNT to the second data processing circuit 328. The sync detection circuit 324B may include a synchronization circuit 324-1B and an FSM 324-2B. The sync detection circuit 324B may also include a register 324-3B. The register 324-3B may store error information or time-out information, for example.

Figure 21:
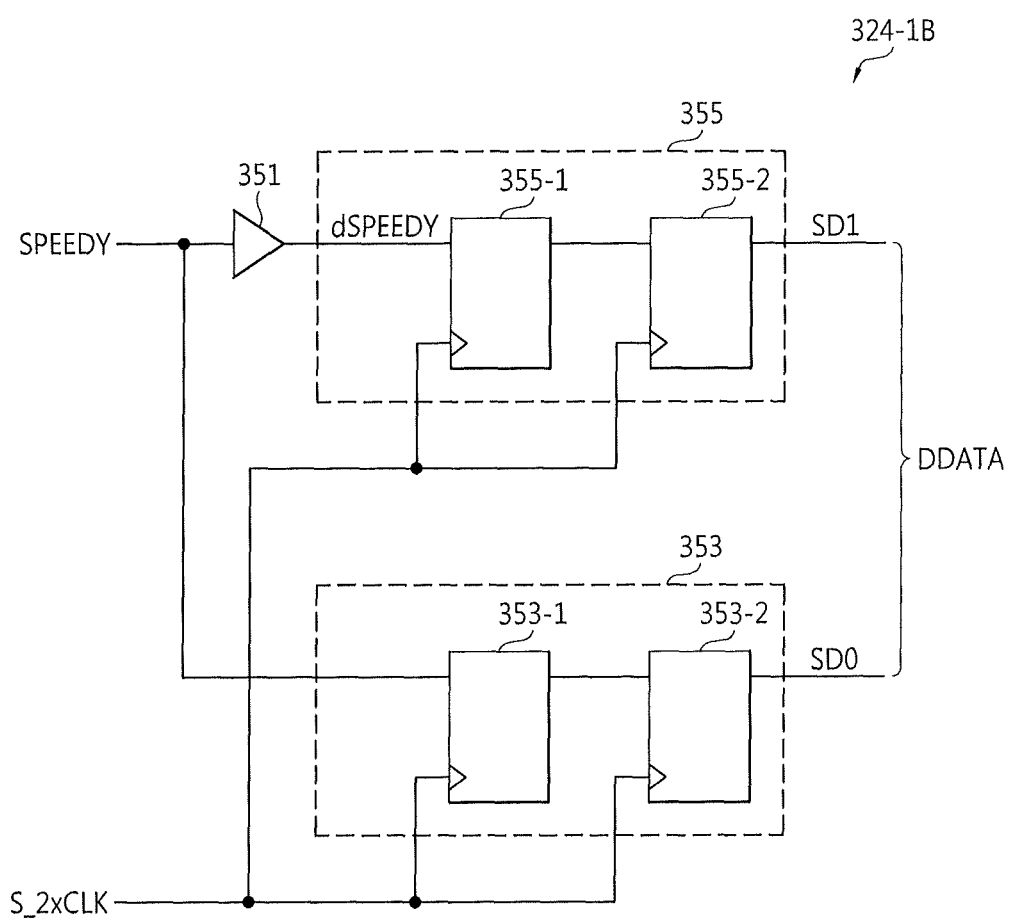
FIG. 21 is a block diagram of a synchronization circuit included in a synch detection circuit illustrated in FIG. 18.

FIG. 21 is a block diagram of the synchronization circuit 324-1B included in the synch detection circuit 324B illustrated in FIG. 18. The synchronization circuit 324-1B may include a delay circuit 351 and two synchronizers 353 and 355.

The delay circuit 351 may delay the transmission frame SPEEDY. The delay circuit 351 may be implemented as a delay buffer, but inventive concepts are not limited thereto.

The first synchronizer 353 may include a first flip-flop 353-1 and a second flip-flop 353-2. The first flip-flop 353-1 may latch (or sample) the transmission frame SPEEDY in response to the slave 2× oversampling clock signal S_2×CLK. The second flip-flop 353-2 may latch an output signal of the first flip-flop 353-1 in response to the slave 2× oversampling clock signal S_2×CLK and output the data SD0.

The second synchronizer 355 may include a third flip-flop 355-1 and a fourth flip-flop 355-2. The third flip-flop 355-1 may latch (or sample) an output signal dSPEEDY of the delay circuit 351 in response to the slave 2× oversampling clock signal S_2×CLK. The fourth flip-flop 355-2 may latch an output signal of the third flip-flop 355-1 in response to the slave 2× oversampling clock signal S_2×CLK and output data SD1.

Figure 22:
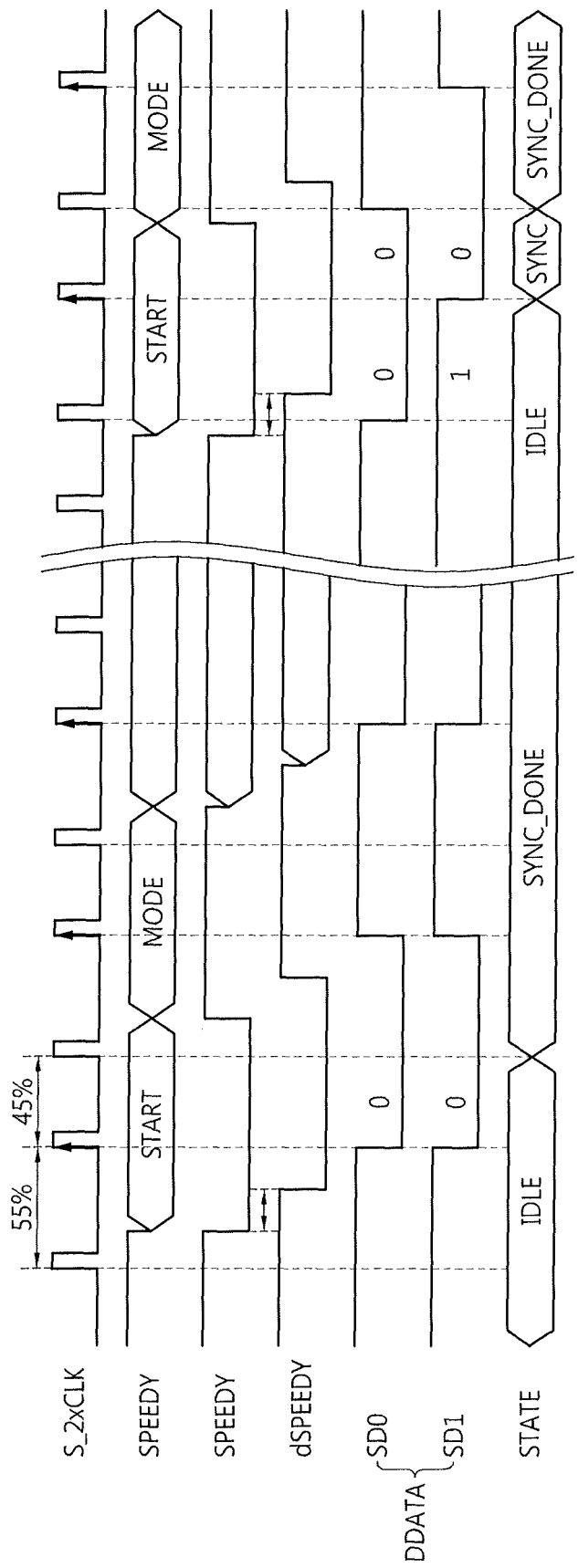
FIG. 22 is a timing chart of signals for explaining a synchronization process and a sampling process which are performed using a 2× oversampling clock signal according to some embodiments of inventive concepts.

FIG. 22 is a timing chart of signals for explaining a synchronization process performed using the slave 2× oversampling clock signal S_2×CLK according to some exemplary embodiments in accordance with principles of inventive concepts. Referring to FIGS. 18 through 22, it is assumed the clock generator 322B periodically generates the slave 2× oversampling clock signal S_2×CLK having a duty cycle of 55% and a duty cycle of 45%, but inventive concepts are not restricted thereto.

Figure 23:
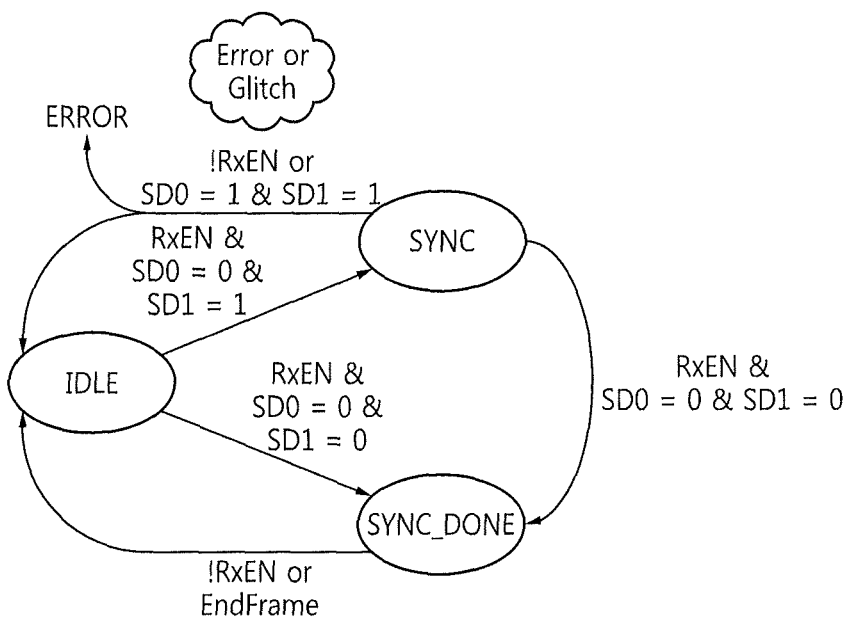
FIG. 23 is a state diagram of an FSM, which is included in the sync detection circuit illustrated in FIG. 18 and performs the synchronization process using 2× oversampling.
Figure 24:
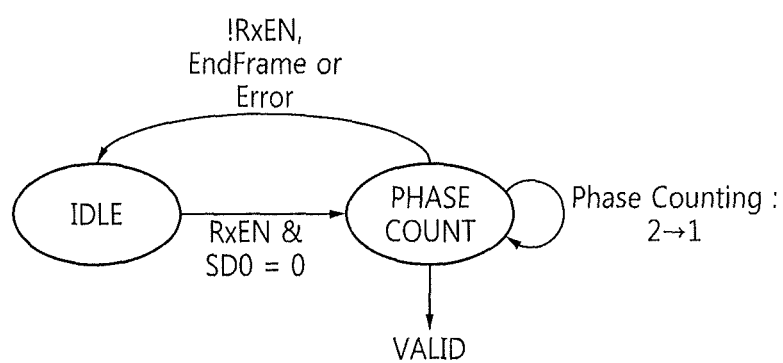
FIG. 24 is a state diagram for explaining a phase count operation of the FSM, which is included in the sync detection circuit illustrated in FIG. 18 and performs the synchronization process using 2× oversampling.

FIG. 23 is a state diagram of the FSM 324-2B, which is included in the sync detection circuit 324B illustrated in FIG. 18 and performs the synchronization process using slave 2× oversampling. FIG. 24 is a state diagram for explaining a phase count operation of the FSM 324-2B.

Referring to FIGS. 18 through 24, the FSM 324-2B may generate the validity indication signal VALID and the phase count PCNT using the data DDATA (=SD0 and SD1) sampled by the synchronization circuit 324-1B, the reception enable signal RxEN, and the frame end signal EndFrame. It is assumed that the reception enable signal RxEN is activated to "1" when the slave device 300 is in reception mode and is deactivated to "0" when the slave device 300 is in a transmission mode. It is also assumed that the frame end signal EndFrame is deactivated to "0" when the reception of the transmission frame SPEEDY is not completed and is activated to "1" when the reception of the transmission frame SPEEDY is completed. The phase count PCNT is assumed to be down-counted, like 2 and 1, sequentially in each period of the slave 2× oversampling clock signal S_2×CLK. In other embodiments, the phase count PCNT may be up-counted, like 1 and 2, sequentially in each period of the slave 2× oversampling clock signal S_2×CLK.

The synchronization circuit 324-1B may sample the start bit value of the start field START using a second clock phase of the slave 2× oversampling clock signal S_2×CLK and may output the sampled bit values SD0 (=0) and SD1 (=0).

The FSM 324-2B may transit from the idle state IDLE to the synchronization-done state SYNC_DONE in response to the sampled bit values SD0 (=0) and SD1 (=0) at the rising edge of the second clock phase and the reception enable signal RxEN(=1) activated. However, the FSM 324-2B may transit from the idle state IDLE to the synchronization state SYNC in response to the sampled bit values SD0 (=0) and SD1 (=1) at the rising edge of the second clock phase and the reception enable signal RxEN(=1) activated.

When the reception enable signal RxEN which has been activated is deactivated or the sampled bit value SD0 transits to "1" due to an error or glitch in the synchronization state SYNC, the FSM 324-2B may transit from the synchronization state SYNC to the idle state IDLE and may generate the error signal ERROR. A bit value corresponding to the error signal ERROR may be stored in the register 324-3B, for example.

However, when the reception enable signal RxEN is maintained activated and the sampled bit values SD0 and SD1 are all "0" in the synchronization state SYNC, the FSM 324-2B may transit from the synchronization state SYNC to the synchronization-done state SYNC_DONE.

The FSM 324-2B may generate the activated validity indication signal VALID indicating that the second clock phase is the one for sampling a bit value included in the transmission frame SPEEDY in each period of the slave 2× oversampling clock signal S_2×CLK.

The second data processing circuit 328 may receive the slave 2× oversampling clock signal S_2×CLK, the validity indication signal VALID, the data DDATA, and the phase count PCNT and may sample a bit value included in the data DDATA using the second clock phase of the slave 2× oversampling clock signal S_2×CLK. In detail, the second data processing circuit 328 may sample a bit value included in the data DDATA output from the synchronization circuit 324-1B using the second clock phase of the slave 2× oversampling clock signal S_2×CLK and may generate control signals for a write or read operation.

FIG. 25 is a timing chart of signals in a process of controlling a dynamic pull-up resistor included in a device which performs 4× oversampling. When the transmission frame SPEEDY is transferred through the single wire 110, each of the pull-up resistors 271 and 371 may disconnect the pad 214 or 314 from the voltage line for low power consumption and fast transition. In other words, the pull-up resistors 271 and 371 may be disabled. However, while the stop bit of the stop field STOP is being transferred through the single wire 110, the pull-up resistors 271 and 371 may be dynamically controlled.

If both the master device 200 and the slave device 300 were to drive the single wire 110 at the same time, both the devices 200 and 300 may have large energy loss and the pads 214 and 314 may be damaged. If none of the devices 200 and 300 were to drive the single wire 110, large short current may flow across the single wire 110, which would result in large energy loss and instability of the devices 200 and 300. Therefore, the enable or disable of the pull-up resistors 271 and 371 is controlled for the change of a direction in accordance with principles of inventive concepts.

When the last data output from the master device 200, that is, the last one of bits included in a field right before the stop field STOP has a value of "0"; the first output driver 212 may strongly drive a stop bit of the first output frame ODATA1 to the first pad 214 since the first output enable signal OEN1 has been activated in a first term I. Accordingly, the rising time of a stop bit included in the transmission frame SPEEDY may be reduced.

When the first term I commences, the first pull-up resistor enable signal PEN1 is activated. Accordingly, the first pull-up resistor 271 is enabled, and therefore, the first operating voltage VDD1 is applied to the single wire 110 via the first pull-up resistor 271 and the first pad 214. The first pull-up resistor 271 enabled may have a resistance of 45 kΩ, but inventive concepts are not restricted thereto. When a fourth term IV commences, the second output enable signal OEN1 is activated, and therefore, the second output driver 312 transmits a bit value to the single wire 110 via the second pad 314.

As shown in FIG. 25, the first term I may refer to a first transmission period TxDATA during which the transmission frame SPEEDY output from the master device 200 is transmitted to the slave device 300 through the single wire 110. A second and third term II and III may refer to a pull-up period PULL-UP during which the single wire 110 is being pulled up to the first operating voltage VDD1 by the first pull-up resistor 271 in a state where both of the output enable signals OEN1 and OEN2 have been deactivated. The fourth term IV may refer to a second transmission period RxDATA during which the transmission frame SPEEDY output from the slave device 300 is transmitted to the master device 200 through the single wire 110.

The activation period of the first pull-up resistor enable signal PEN1 may be variably controlled for stable direction change. For example, the first control circuit 270 may control the activation period of the first pull-up resistor enable signal PEN1. Information for controlling the activation period may be set or programmed in the register 272. A direction change timing may be controlled using the activation and deactivation timings of the output enable signals OEN1 and OEN2, for example.

The first transmission period TxDATA may be determined by the deactivation timing of the first output enable signal OEN1 and the first output driver 212 may drive the single wire 110 in a first direction through the first pad 214 during the first transmission period TxDATA. The second transmission period RxDATA may be determined by the activation timing of the second output enable signal OEN2 and the second output driver 312 may drive the single wire 110 in a second direction through the second pad 314. The first direction and the second direction may be opposite, as in "receive" and "transmit," for example.

FIG. 26 is a timing chart of signals in a process of controlling a dynamic pull-up resistor included in a device which performs 2× oversampling. When a first term "i" commences, the first pull-up resistor enable signal PEN1 is activated. Accordingly, the first pull-up resistor 271 is enabled, and therefore, the first operating voltage VDD1 is applied to the single wire 110 via the first pull-up resistor 271 and the first pad 214. During the first term "i", the first output driver 212 drives a stop bit of "1" to the single wire 110 through the first pad 214. When a second term "ii" commences, the first output enable signal OEN1 is deactivated.

In a third term ①, the second output enable signal OEN2 is activated. When a fourth term ② commences, a start bit of the second output frame ODATA2 transits from "1" to "0".

The activation period of the first pull-up resistor enable signal PEN1 may be variably controlled, as shown in FIG. 26, for stable direction change. For instance, the first control circuit 270 may control the activation period of the first pull-up resistor enable signal PEN1. In exemplary embodiments in accordance with principles of inventive concepts, information for controlling the activation period may be set or programmed in the register 272.

In FIGS. 25 and 26, a variable range of the first pull-up resistor enable signal PEN1 is marked by hatched lines.

Errors may detected in accordance with principles of inventive concepts using the methods described below.

Firstly, referring to FIGS. 14 and 16, in order to prevent the second processing circuit 320 from malfunctioning due to an error or glitch, when the data SD0 is detected as "1" or the reception enable signal RxEN is detected as "0" in the synchronization state SYNC, the FSM 324-2 may set (or program) the error signal ERROR in the error status register 324-3 and may transit to the idle state IDLE. When synchronization fails, the FSM 324-2 may check whether a bit value of the stop field STOP is "1", may set (or program) the error signal ERROR in the error status register 324-3, and may transit to the idle state IDLE.

Secondly, in order to prevent collision between frames transferred through the single wire 110 in exceptional circumstances, the second control circuit 370 may restrict a maximum response time (or a maximum timeout period) given to respond to a command frame output from the master device 200. The maximum response time may be stored in the register 372 which can be accessed by the second control circuit 370 and may be set (or programmed) in the register 372 by the second control circuit 370, for example.

When the slave device 300 does not respond within the maximum response time (or the maximum timeout period), the second control circuit 370 may withdraw the control of the second output enable signal OEN2. In other words, in accordance with principles of inventive concepts the second control circuit 370 may generate the second output enable signal OEN2 deactivated. Since the control of the second output enable signal OEN2 is withdrawn by the second control circuit 370, the master device 200 cannot determine the status of the slave device 300 and may thus send the slave device 300 a command frame for obtaining information set in the register 372.

Figure 27:
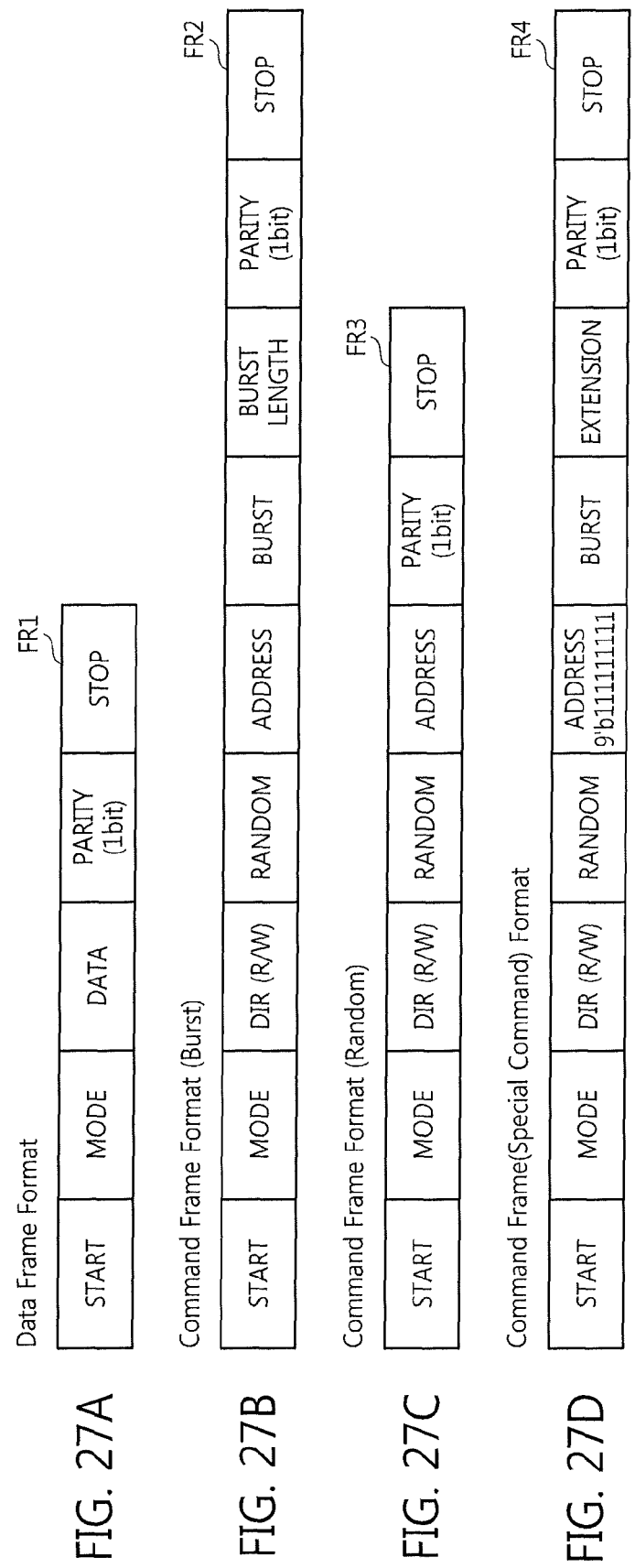
FIGS. 27A to 27D are diagrams of command frame format and a data frame format, which include a parity bit, in a protocol according to some embodiments of inventive concepts.

Thirdly, the master device 200 may add a parity bit to a command frame or a data frame for error detection. A method of adding a parity bit will be described in greater detail with reference to FIG. 27.

FIGS. 27A to 27D are diagrams of a command frame format and a data frame format, which include a parity bit, in a protocol according to some embodiments of inventive concepts. A parity bit or a check bit is added to the end of a string of binary codes to indicate whether the number of 1s in the string is either an odd number or an even number. The parity bit is used as the simplest form of an error detecting code. The parity bit is classified as an even parity bit or an odd parity bit. The even parity bit determines a parity bit so that the number of 1s among all bits included in a string becomes an even number. The odd parity bit determines a parity bit so that the number of 1s among all bits included in a string becomes an odd number.

The master device 200 may add an even parity bit or an odd parity bit to a frame (for example, a command frame or a data frame). In detail, the first frame generator 210 of the master device 200 may add an even parity bit or an odd parity bit to a frame (for example, a command frame or a data frame) according to the control of the first control circuit 270.

The second processing circuit 320 of the slave device 300 may detect an error in the frame transmitted from the master device 200 using the parity bit included in the frame and may store a detection result in a register. When an error is detected in the frame, the slave device 300 may send the detection result to the master device 200 and the master device 200 may retransmit the frame to the slave device 300 in response to the detection result.

Although a parity bit field PARITY including a parity bit is added right before the stop field STOP of each of frame formats FR1 through FR4 in the embodiments illustrated in FIGS. 27A to 27D, the parity bit field PARITY may be added at different positions in the frame formats FR1 through FR4 in other embodiments in accordance with principles of inventive concepts. The parity bit may be one bit in length but inventive concepts are not limited thereto.

FIG. 27A shows the data frame format FR1 including the parity bit field PARITY. FIG. 27B shows the burst command frame format FR2 including the parity bit field PARITY. FIG. 27C shows the random command frame format FR3 including the parity bit field PARITY. FIG. 27D shows the command frame (special command) format FR4 including the parity bit field PARITY.

Referring to FIG. 27D, when all bits included in the address field ADDRESS are "1", the slave device 300 may stop or reset a current operation (for example, a write operation or a read operation), so that the slave device 300 does not execute a wrong command. The bits included in the address field ADDRESS are all "1" in the embodiments illustrated in FIG. 27D. However, when the bits included in the address field ADDRESS are set to particular bits (or a particular pattern) predetermined between the devices 200 and 300, the slave device 300 may stop or reset a current operation in response to the predetermined particular bits. Additionally, if the master device 200 were to send an abnormal frame (a frame which does not fit into any of the frame formats illustrated in FIGS. 2 through 4) to the slave device 300, the slave device 300 may stop or reset a current operation in response to the abnormal frame.

Figure 28:
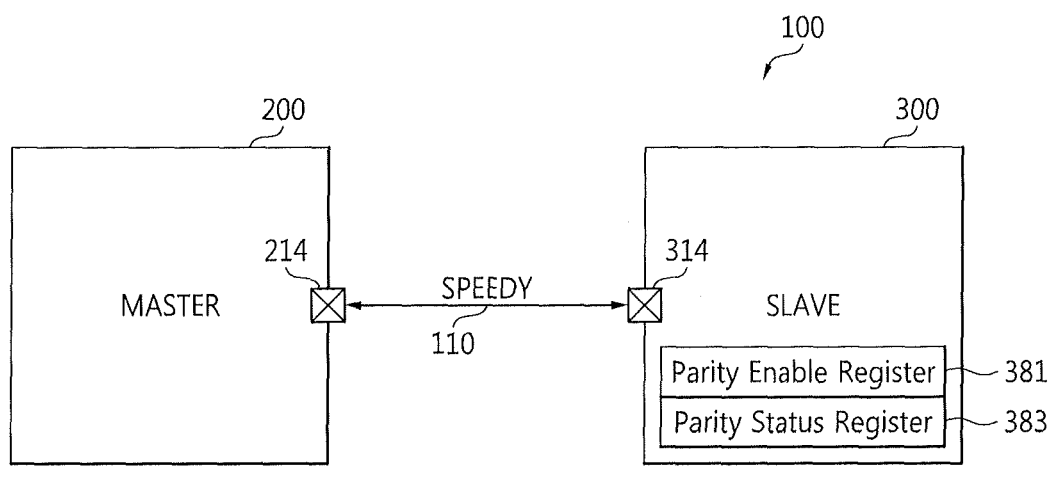
FIG. 28 is a block diagram of a data processing system including a slave device which includes a parity enable register and a parity status register according to some embodiments of inventive concepts.

FIG. 28 is a block diagram of the data processing system 100 including the slave device 300 which includes a parity enable register 381 and a parity status register 383 according to some embodiments of inventive concepts. Referring to FIGS. 1 and 28, the slave device 300 may include the parity enable register 381 and the parity status register 383 in addition to the elements 310, 312, 314, 316, 320, 370, and 371 illustrated in FIG. 1.

FIGS. 29A to 29D are diagrams of frame formats in a parity enabling process in a protocol according to some embodiments of inventive concepts. In exemplary embodiments, it is assumed that the parity enable register 381 and the parity status register 383 are the same register, but inventive concepts are not limited thereto.

Referring to FIG. 28 and FIG. 29A, the master device 200 may send the slave device 300 through the single wire 110 a write frame, that is, a write command frame for writing a bit for enabling to the parity enable register 381. The parity enable register 381 may be determined by bits included in the address field ADDRESS.

Referring to FIG. 28 and FIG. 29B, in exemplary embodiments the master device 200 may send the slave device 300 through the single wire 110 a data frame for writing bits "22'b0000000000000000000001" for enabling to the parity enable register 381. Accordingly, the bits for enabling, that is, "22'b0000000000000000000001" may be stored in the parity enable register 381.

Referring to FIG. 28 and FIG. 29C, in exemplary embodiments the master device 200 may send the slave device 300 through the single wire 110 a command frame for reading bits "22'b0000000000000000000001" stored in the parity status register 383, for example, a read command frame including the parity bit field PARITY. In response to the read command frame, the slave device 300 may read the bits "22'b0000000000000000000001" from the parity status register 383 and may send the master device 200 a data frame including the bits "22'b0000000000000000000001", for example, a read data frame including the parity bit field PARITY.

FIGS. 30A to 30D are diagram of frame formats in a parity disabling process in a protocol according to some embodiments in accordance with principles of inventive concepts. In exemplary embodiments, it is assumed that the parity enable register 381 and the parity status register 383 are the same register, but inventive concepts are not restricted thereto.

Referring to FIG. 28 and FIG. 30A, the master device 200 may send the slave device 300 through the single wire 110 a write frame, that is, a write command frame for writing a bit for disabling to the parity enable register 381. The parity enable register 381 may be determined by bits included in the address field ADDRESS.

Referring to FIG. 28 and FIG. 30B, the master device 200 may send the slave device 300 through the single wire 110 a data frame for writing bits "22'b0000000000000000000000" for disabling to the parity enable register 381. Accordingly, the bits for enabling, that is, "22'b0000000000000000000000" may be stored in the parity enable register 381.

Referring to FIG. 28 and FIG. 30C, in exemplary embodiments the master device 200 may send the slave device 300 through the single wire 110 a command frame for reading bits "22'b0000000000000000000000" stored in the parity status register 383, for example, a read command frame including the parity bit field PARITY. In response to the read command frame, the slave device 300 may read the bits "22'b0000000000000000000000" from the parity status register 383 and may send the master device 200 a data frame including the bits "22'b0000000000000000000000", for example, a read data frame including the parity bit field PARITY.

Figure 31:
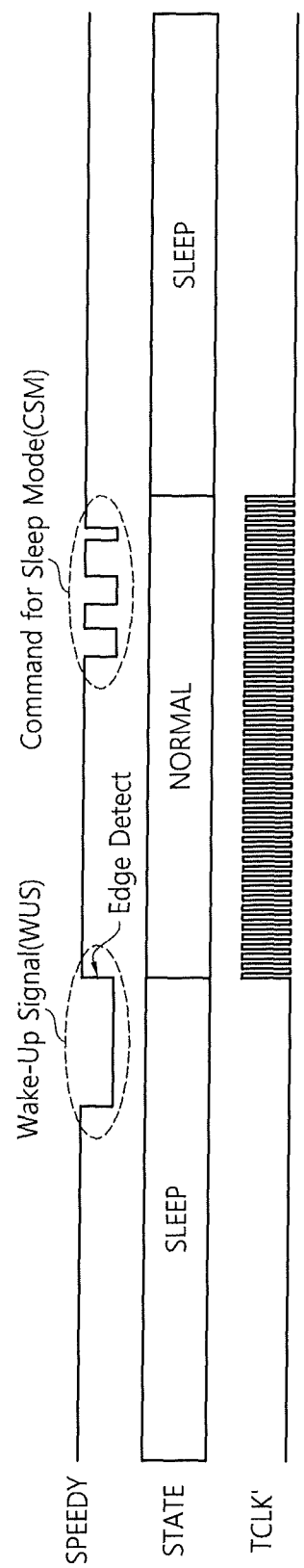
FIG. 31 is a timing chart showing a process in which a master device illustrated in FIG. 1 controls a power mode of the slave device illustrated in FIG. 1.

FIG. 31 is a timing chart showing a process in which the master device 200 illustrated in FIG. 1 controls a power mode of the slave device 300 illustrated in FIG. 1 in accordance with principles of inventive concepts. Referring to FIGS. 1, 14, 18, and 31, when the data processing system 100 is booted, the slave device 300 may operate in a sleep state for a low-power operation. As shown in FIG. 31, when the slave device 300 operates in the sleep state, the mask circuit 327-2 may block the transmission of the clock signal TCLK in response to the enable signal EN at the low level.

The enable signal generator 327-1 may control the activation or deactivation of the enable signal EN based on a signal input through the second pad 314, for example, a signal included in the transmission frame SPEEDY. In detail, the enable signal generator 327-1 may detect a rising edge of the signal input through the second pad 314 and may generate the enable signal EN at a high level according to the detection result. The mask circuit 327-2 may output the clock signal TCLK as the output clock signal TCLK' in response to the enable signal EN at the high level. As a result, the slave device 300 is changed from the sleep state to the normal state and thus woken up.

For example, the master device 200 may send a wake-up signal WUS to the slave device 300 to change the slave device 300 from the sleep state to the wake-up state (or a wake-up mode).

The master device 200 may send a command-for-sleep mode CSM to the slave device 300 to change the slave device 300 from the normal state to the sleep state. The command-for-sleep mode CSM may be transmitted as the transmission frame SPEEDY from the master device 200 to the slave device 300.

The enable signal generator 327-1 may generate the enable signal EN at the low level using the command-for-sleep mode CSM (=SPEEDY). As a result, the mask circuit 327-2 may block the clock signal TCLK to the clock generator 322A or 322B. As the clock signal TCLK is blocked, the power consumption of the slave device 300 is reduced.

As described above, the master device 200 may send a signal, for example, the transmission frame SPEEDY, for operating the slave device 300 in the sleep state or the normal state to the slave device 300 through the single wire 110. The sleep state may include an idle state and the normal state may include a wake-up state.

Figure 32:
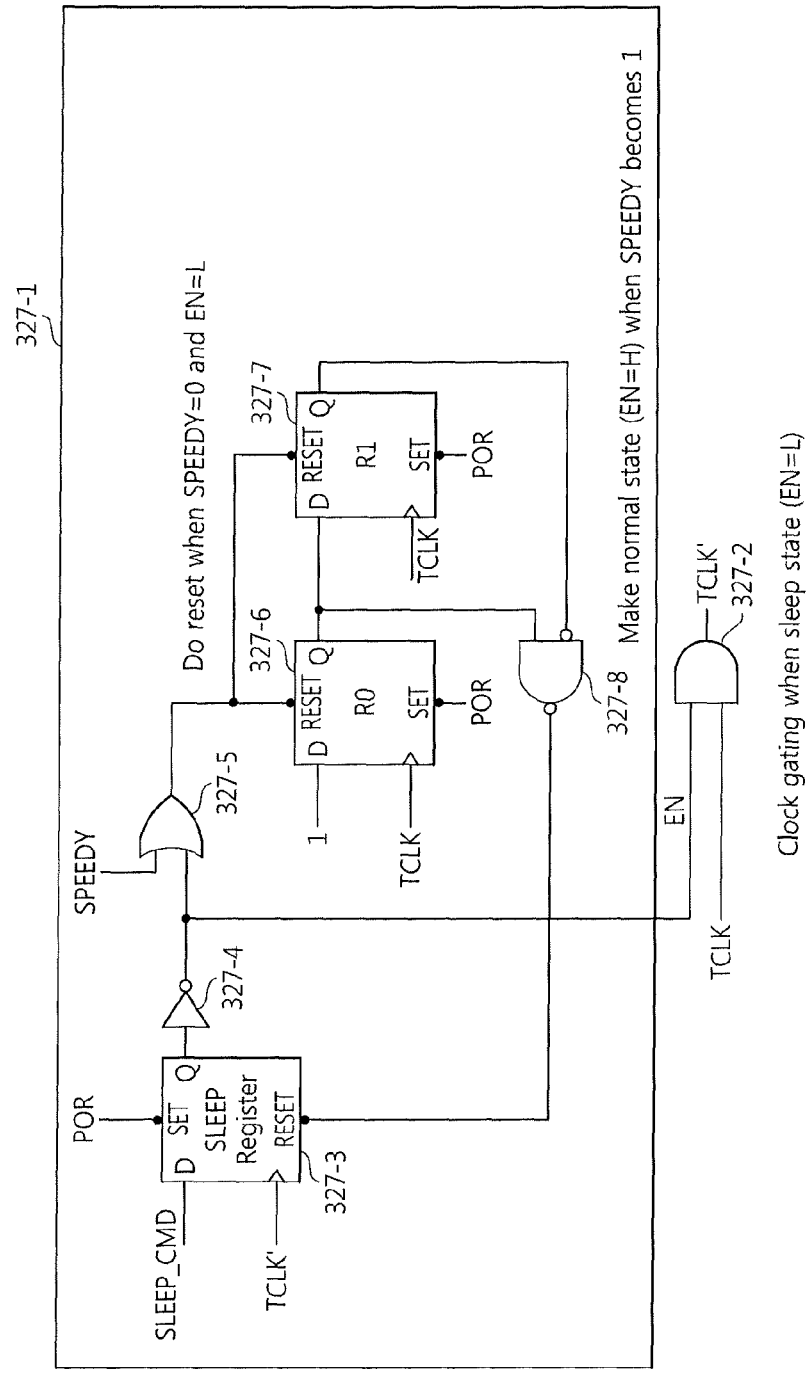
FIG. 32 is a diagram of a clock gating circuit according to some embodiments of inventive concepts.
Figure 33:
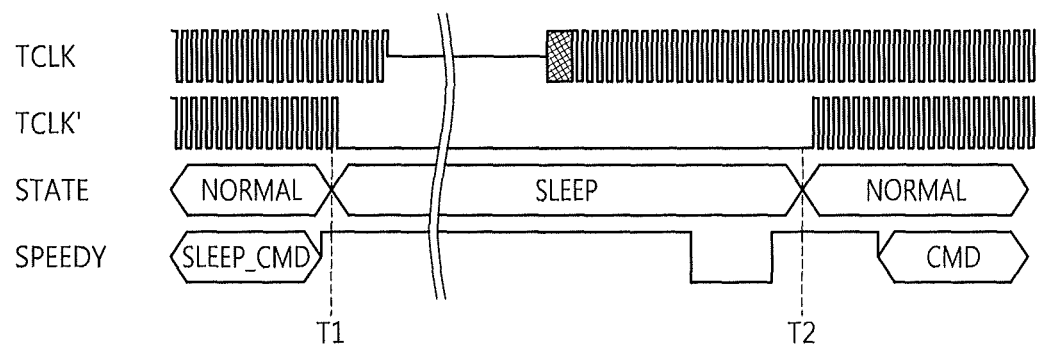
FIG. 33 is a timing chart showing the operation of the clock gating circuit illustrated in FIG. 32.

FIG. 32 is a diagram of a clock gating circuit according to some exemplary embodiments of inventive concepts. FIG. 33 is a timing chart showing the operation of the clock gating circuit illustrated in FIG. 32. Referring to FIGS. 1, 14, 18, 31, 32, and 33, the master device 200 may use a power-on-reset (POR) signal or write a sleep command SLEEP_CMD for the sleep state to a sleep register 327-3 in order to control the slave device 300 to be in the sleep state.

The sleep command SLEEP_CMD may be transmitted to the enable signal generator 327-1 using the transmission frame SPEEDY.

When the POR signal transits to a high level, flip-flops 327-3, 327-6, and 327-7 may latch an output signal Q at a high level. Accordingly, an inverter 327-4 outputs a signal (that is, the enable signal EN) at the low level. As a result, the mask circuit 327-2 blocks the transmission of the clock signal TCLK.

When the slave device 300 is in the normal state, that is, when the enable signal EN is at the high level; the mask circuit 327-2 may output the clock signal TCLK as the output clock signal TCLK'.

In exemplary embodiments, in order to change the slave device 300 from the normal state to the sleep state, the master device 200 may send the sleep command SLEEP_CMD to the slave device 300. The sleep command SLEEP_CMD may be transmitted as the transmission frame SPEEDY. The enable signal generator 327-1 may generate the enable signal at the low level and the mask circuit 327-2 may block the transmission of the clock signal TCLK in the sleep state.

In exemplary embodiments, in order to change the slave device 300 from the sleep state to the normal state, the master device 200 may send a normal command CMD to the slave device 300. The normal command CMD may be transmitted as the transmission frame SPEEDY. When the transmission frame SPEEDY transits to "1", the enable signal generator 327-1 may generate the enable signal EN at the high level and the mask circuit 327-2 may output the clock signal TCLK as the output clock signal TCLK'. The slave device 300 may be changed from the normal state to the sleep state at a first time point T1 and may be changed from the sleep state to the normal state at a second time point T2.

Figure 34:
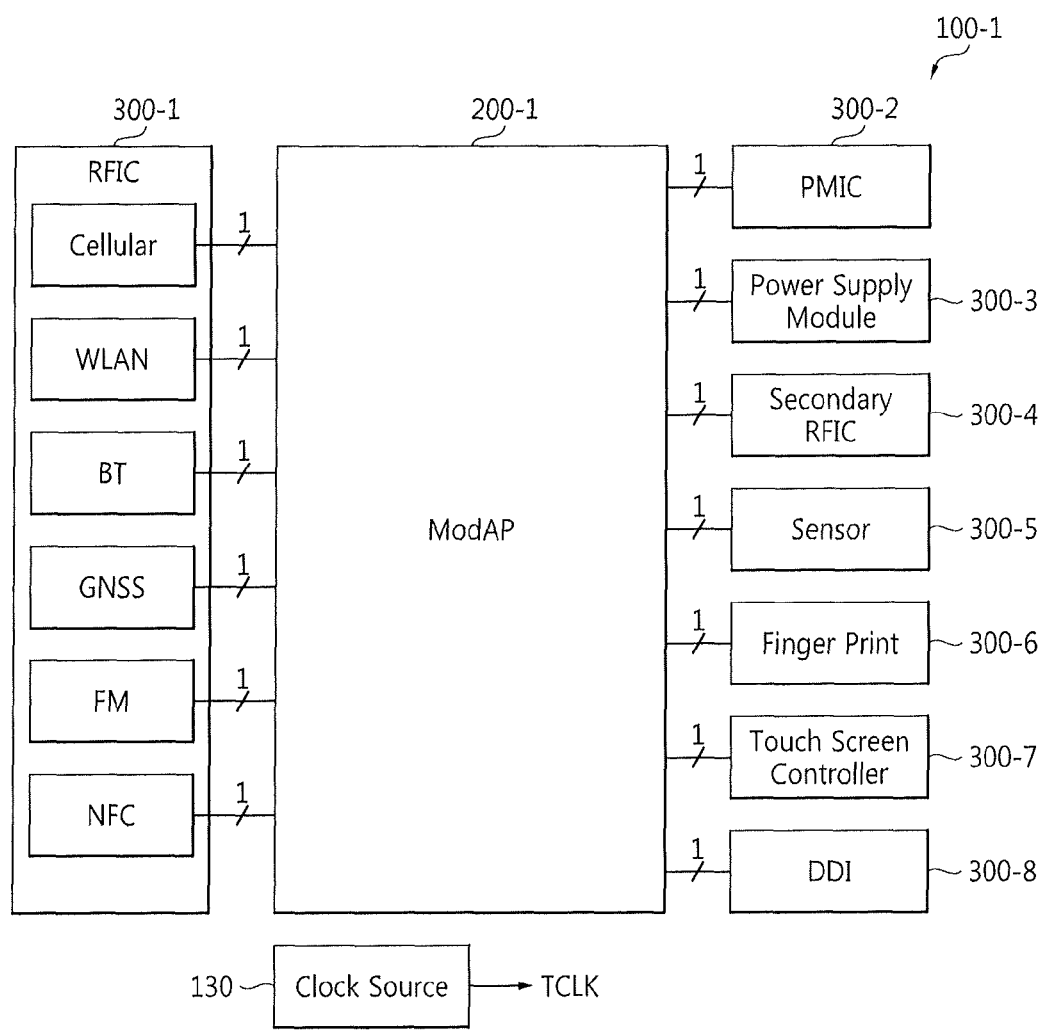
FIG. 34 is a block diagram of a data processing system according to other embodiments of inventive concepts.

FIG. 34 is a block diagram of a data processing system 100-1 according to other exemplary embodiments in accordance with principles of inventive concepts. Referring to FIGS. 1 and 32, a master device 200-1 may be a processor that can control slave devices 300-1 through 300-8. An independent single wire may be connected between the master device 200-1 and each of the slave devices 300-1 through 300-8. As described above, the master device 200-1 may be implemented as a baseband modem processor chip, a chip which can function as both a modem and an AP, an AP, or a mobile AP, but inventive concepts are not restricted thereto.

The slave devices 300-1 through 300-8 may include the RFIC 300-1, the power management IC (PMIC) 300-2, the power supply module 300-3, the secondary RFIC 300-4, the sensor 300-5, the fingerprint recognition chip 300-6, the touch screen controller 300-7, the digital display interface or display driver IC (DDI) 300-8. The RFIC 300-1 may include at least one connectivity chip. The connectivity chip may include a chip for mobile communication, a chip for WLAN, a chip for Bluetooth communication, a chip for GNSS communication, a chip for processing FM audio/video, NFC, and/or a chip for Wi-Fi communication, but inventive concepts are not restricted thereto.

FIG. 35 is a block diagram of a data processing system 100-2 according to exemplary embodiments of inventive concepts. Referring to FIGS. 1 and 35, the data processing system 100-2 may include a master device 200A, the slave device 300, the first clock source 411, and the second clock source 413. It is assumed that the first clock source 411 generates a first clock signal MCLK having a first frequency and the second clock source 413 generates the second clock signal TCLK having a second frequency.

A phase locked loop (PLL) 280 included in the master device 200A may receive the first clock signal MCLK and generate the second clock signal TCLK having the second frequency. In other words, the PLL 280 may generate the second clock signal TCLK having the same frequency as the second clock signal TCLK provided for the second processing circuit 320 of the slave device 300 and provide the second clock signal TCLK for the first processing circuit 220.

As described above, according to some exemplary embodiments in accordance with principles of inventive concepts, a master device or a slave device may include only one pad connected to a single wire interface, thereby reducing the number of pads for the interface to one. As the number of pads is reduced, the number of output drivers driving output data to the pad and the number of input buffers processing data input through the pad are also reduced. As a result, the size of a die or a chip is reduced. Because the number of pads is reduced to one, power consumption of the master device or the slave device is also decreased.

While inventive concepts has been particularly shown and described with reference to exemplary embodiments thereof, it will be understood by those of ordinary skill in the art that various changes in forms and details may be made therein without departing from the spirit and scope of inventive concepts as defined by the following claims.

What is claimed is:

1. A master device which communicates with a slave device, the master device comprising:
   a single pad configured to communicate a command frame including an address and a data frame, the data frame including data, with the slave device via a single wire; and
   a processing circuit configured to generate an oversampling clock signal from a clock signal, to perform a synchronization process for selecting one of a plurality of clock phases of the oversampling clock signal, and to perform a sampling process for sampling an each bit value included in the data frame transmitted from the slave device using the same clock phase as the clock phase selected during the synchronization process.

2. The master device of claim 1, wherein each of the command frame and the data frame comprises a start bit value and a stop bit value and the processing circuit configured to perform the synchronization process on the start bit value.

3. The master device of claim 1, wherein the processing circuit comprises:
   a sync detection circuit; and
   a data processing circuit,
   wherein the sync detection circuit configured to generate a plurality of clock phase selection signals related to the selected clock phase in each period of the oversampling clock signal and the data processing circuit configured to sample the each bit value included in the data frame in the each period of the oversampling clock signal using a clock phase related to the plurality of clock phase selection signals.

4. The master device of claim 3, wherein the oversampling clock signal is a 4× oversampling clock signal.

5. The master device of claim 3, wherein the oversampling clock signal is a 2× oversampling clock signal.

6. The master device of claim 1, wherein the single wire does not comprise a clock line configured to transmit the clock signal to the slave device.

7. The master device of claim 1, wherein the master and slave devices have clock signals of the same frequency.

8. The master device of claim 1, further comprising:
   a pull-up resistor configured to control connection between a voltage supply line and the single pad in response to a pull-up resistor enable signal; and
   an output driver connected to the single pad.

9. The master device of claim 8, further comprising a control circuit configured to activate the pull-up resistor enable signal when a stop bit value included in the command frame is transmitted to the single pad through the output driver.

10. The master device of claim 1, further comprising a frame generator configured to generate the command frame including a parity bit.

11. A slave device which communicates with a master device, the slave device comprising:
    a single pad configured to communicate a command frame including an address and a data frame including data with the master device via a single wire; and
    a processing circuit configured to generate an oversampling clock signal from a clock signal, to select one clock phase from among a plurality of clock phases of the oversampling clock signal, and to sample an each bit value included in the data frame transmitted from the master device using the one clock phase.

12. The slave device of claim 11, wherein the processing circuit comprises:
    a sync detection circuit; and
    a data processing circuit,
    wherein the sync detection circuit configured to generate a plurality of clock phase selection signals related to the one clock phase in each period of the oversampling clock signal and the data processing circuit configured to sample the each bit value included in the data frame in each period of the oversampling clock signal using the one clock phase related to the plurality of clock phase selection signals.

13. The slave device of claim 12, wherein the oversampling clock signal is a 4× oversampling clock signal.

14. The slave device of claim 12, wherein the oversampling clock signal is a 2× oversampling clock signal.

15. The slave device of claim 11, wherein the single wire does not comprise a clock line configured to transmit the clock signal.

16. A master device that communicates with a slave device, comprising:
    a processing circuit configured to communicate a command frame and a data frame through a single asynchronous serial link with the slave device; and
    a single pad configured to output the command frame and the data frame to the single asynchronous serial link,
    wherein the command frame includes a burst frame and a random frame allowing burst transmission of stream data from the master device to the slave device,
    wherein the single asynchronous serial link does not comprise a clock line configured to transmit a clock signal to the slave device.

17. The master device of claim 16, wherein the processing circuit is further configured to generate an oversampling clock signal from a clock signal, to perform a synchronization process for selecting one of a plurality of clock phases of the oversampling clock signal, and to perform a sampling process for sampling each bit value included in the data frame transmitted from the slave device using a clock phase at the same position as the clock phase selected during the synchronization process.

18. The master device of claim 17, wherein the processing circuit comprises:
   a sync detection circuit; and
   a data processing circuit,
   wherein the sync detection circuit configured to generate a plurality of clock phase selection signals related to the selected clock phase in each period of the oversampling clock signal and the data processing circuit configured to sample the each bit value included in the data frame in the each period of the oversampling clock signal using a clock phase related to the plurality of clock phase selection signals.

19. The master device of claim 18, further comprising:
   a pull-up resistor configured to control connection between a voltage supply line and a single pad through which asynchronous serial communication flows in response to a pull-up resistor enable signal; and
   an output driver connected to the single pad.

20. The master device of claim 19, further comprising a control circuit configured to activate the pull-up resistor enable signal when a stop bit value included in the command frame is transmitted to the single pad through the output driver.

* * * * *